United States Patent [19]

Migdal et al.

[11] Patent Number: 5,760,783

[45] Date of Patent: Jun. 2, 1998

[54] METHOD AND SYSTEM FOR PROVIDING TEXTURE USING A SELECTED PORTION OF A TEXTURE MAP

[75] Inventors: Christopher Joseph Migdal, Mt. View; James L. Foran, Milpitas; Michael Timothy Jones, Los Altos; Christopher Clark Tanner, San Jose, all of Calif.

[73] Assignee: Silicon Graphics, Inc., Mountain View, Calif.

[21] Appl. No.: 554,047

[22] Filed: Nov. 6, 1995

[51] Int. Cl.$^6$ .................................................. G06T 11/00
[52] U.S. Cl. ............................................................. 345/430
[58] Field of Search .................................. 395/128–132, 395/125–127; 345/430

[56] References Cited

U.S. PATENT DOCUMENTS

| | | | |
|---|---|---|---|
| 4,727,365 | 2/1988 | Bunker et al. | 340/728 |
| 4,974,176 | 11/1990 | Buchner et al. | 364/522 |
| 5,097,427 | 3/1992 | Lathrop et al. | 395/130 |
| 5,490,240 | 2/1996 | Foran et al. | 395/130 |

FOREIGN PATENT DOCUMENTS

| | | |
|---|---|---|
| 0 447 227 A2 | 9/1991 | European Pat. Off. |
| 0 513 474 A1 | 11/1992 | European Pat. Off. |

OTHER PUBLICATIONS

Blinn, Jim, "Jim Blinn's Corner: The Truth About Texture Mapping," *IEEE Computer Graphics & Applications*, Mar., 1990, pp. 78–83.

Foley et al., "17.4.3 Other Pattern Mapping Techniques," *Computer Graphics: Principles and Practice*, 1990, pp. 826–828.

Cosman, M., "Global Terrain Texture: Lowering the Cost," *Proceedings of the 1994 Image VII Conference*, Tempe, Arizona: The Image Society, pp. 53–64.

Dungan, W. et al., "Texture Tile Considerations for Raster Graphics," *Siggraph '78 Proceedings* (1978) pp. 130–134.

Economy, R. et al., "The Application of Aerial Photography and Satellite Imagery to Flight Simulation," pp. 280–287.

Foley et al., *Computer Graphics Principles and Practice*, Second Edition, Addison–Wesley Publishing Company, Reading, Massachusetts (1990), pp. 742–743 and 826–828.

Watt, A., *Fundamentals of Three–Dimensional Computer Graphics*, Addison–Wesley Publishing Company, USA (1989), pp. 227–250.

Williams, L., "Pyramidal Parametrics," *Computer Graphics*, vol. 17, No. 3, Jul. 1983, pp. 1–15.

*Primary Examiner*—Almis R. Jankus
*Attorney, Agent, or Firm*—Sterne, Kessler, Goldstein & Fox P.L.L.C.

[57] ABSTRACT

An apparatus and method for quickly and efficiently providing texel data relevant for displaying a textured image. A large amount of texture source data, such as photographic terrain texture, is stored as a two-dimensional or three-dimensional texture MIP-map on one or more mass storage devices. Only a relatively small clip-map representing selected portions of the complete texture MIP-map is loaded into faster, more expensive memory. These selected texture MIP-map portions forming the clip-map consist of tiles which contain those texel values at each respective level of detail that are most likely to be mapped to pixels being rendered for display based upon the viewer's eyepoint and field of view. To efficiently update the clip-map in real-time, texel data is loaded and discarded from the edges of tiles. Attempts to access a texel lying outside of a particular clip-map tile are accommodated by utilizing a substitute texel value obtained from the next coarser resolution clip-map tile which encompasses the sought texel.

28 Claims, 14 Drawing Sheets

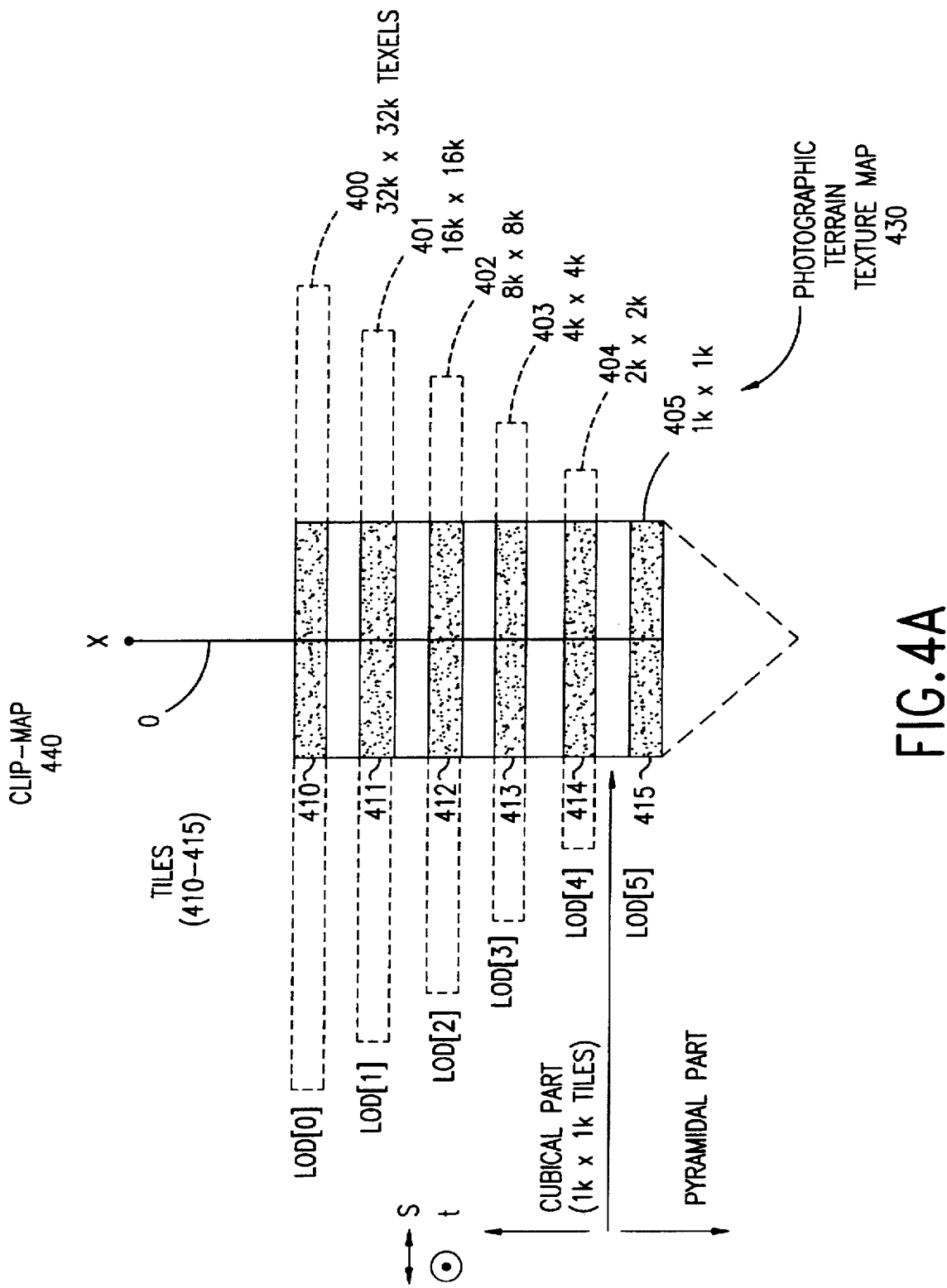

METHOD AND SYSTEM FOR PROVIDING TEXTURE USING A SELECTED PORTION OF A TEXTURE MAP

BACKGROUND OF THE INVENTION

1. Field of the Invention

The present invention pertains to the field of computer graphics. More particularly, the present invention relates to an apparatus and method for providing texel data from selected portions of a texture MIP-map (referred to herein as a clip-map).

2. Related Art

Computer systems are commonly used for displaying graphical objects on a display screen. These graphical objects include points, lines, polygons, and three dimensional solid objects. By utilizing texture mapping techniques, color and other details can be applied to areas and surfaces of these objects. In texture mapping, a pattern image, also referred to as a "texture map," is combined with an area or surface of an object to produce a modified object with the added texture detail. For example, given the outline of a featureless cube and a texture map defining a wood grain pattern, texture mapping techniques can be used to "map" the wood grain pattern onto the cube. The resulting display is that of a cube that appears to be made of wood. In another example, vegetation and trees can be added by texture mapping to an otherwise barren terrain model. Likewise, labels can be applied onto packages or cans for visually conveying the appearance of an actual product. Textures mapped onto geometric surfaces provide motion and spatial cues that surface shading alone might not provide. For example, a sphere rotating about its center appears static until an irregular texture or pattern is affixed to its surface.

The resolution of a texture varies, depending on the viewpoint of the observer. The texture of a block of wood displayed up close has a different appearance than if that same block of wood were to be displayed far away. Consequently, there needs to be some method for varying the resolution of the texture (e.g., magnification and minification). One approach is to compute the variances of texture in real time, but this filtering is too slow for complex textures and/or requires expensive hardware to implement.

A more practical approach first creates and stores a MIP-map (multum in parvo meaning "many things in a small place"). The MIP-map consists of a texture pattern pre-filtered at progressively lower or coarser resolutions and stored in varying levels of detail (LOD) maps. See, e.g., the explanation of conventional texture MIP-mapping in Foley et al., *Computer Graphics Principles and Practice*, Second Edition, Addison-Wesley Publishing Company, Reading, Mass. (1990), pages 742–43 and 826–828 (incorporated by reference herein).

FIG. 1A shows a conventional set of texture LOD maps having pre-filtered texel data associated with a particular texture. Four different levels of detail (LOD[0]-LOD[3]m) are shown. Each successive coarser texture LOD has a resolution half that of the preceding LOD until a unitary LOD is reached representing an average of the entire high resolution base texture map LOD[0]. Thus, in FIG. 1A, LOD[0] is an 8×8 texel array; LOD[1] is a 4×4 texel array; LOD[2] is a 2×2 texel array; and LOD [3] is a single 1×1 texel array. Of course, in practice each LOD can contain many more texels, for instance, LOD[0] can be 8k×8k, LOD[1] 4k×4k, and so forth depending upon particular hardware or processing limits.

The benefit of MIP-mapping is that filtering is only performed once on texel data when the MIP-map is initially created and stored in LOD maps. Thereafter, texels having a dimension commensurate with pixel size are obtained by selecting the closest LOD map having an appropriate resolution. By obtaining texels from the pre-filtered LOD maps, filtering does not have to be performed during run-time. More sophisticated filtering operations can be executed beforehand during modeling without delaying real-time operation speed.

To render a display at the appropriate image resolution, a texture LOD is selected based on the relationship between the smallest texel dimension and the display pixel size. For a perspective view of a landscape 100, as shown in FIG. 1B, the displayed polygonal image is "magnified" in a foreground region relative to polygonal regions located closer to the center horizon and background along the direction indicated by the arrow. To provide texture for pixels in the closest foreground region, then, texels are mapped from the finest resolution map LOD[0]. Appropriate coarser LODs are used to map texel data covering pixels located further away from the viewer's eyepoint. Such multi-resolution texture MIP-mapping ensures that texels of the appropriate texture LOD gets selected during pixel sampling. To avoid discontinuities between images at varying resolutions, well-known techniques such as linear interpolation are used to blend the texel values of two LODs nearest a particular image pixel.

One significant drawback to conventional MIP-mapping, however, is the amount of memory consumed by the various texture LOD maps. Main memory in the form of a dynamic random access memory (DRAM) or a static random access memory (SRAM) is an expensive and inefficient site for a large texture MIP-map. Each additional level of detail map at a higher level of detail requires four times more memory. For example, a 16×16 texture array having 256 texture picture elements (texels), is four times bigger than an 8×8 texture array which has 64 texels. To put this increase in perspective, a texture MIP-map having six levels of detail requires over 4,096 times more memory than the texture map at the finest resolution. Implementing large texture MIP-maps quickly becomes an expensive luxury. In addition, for large texture MIP-maps, many portions of the stored MIP-map are not used in a display image.

Memory costs become especially prohibitive in photographic texture applications where the source texture, such as, satellite data or aerial photographs, occupy a large storage area. Creating a pre-filtered MIP-map representation of such source texture data further increases memory consumption.

This problem is further exacerbated by the fact that in order to increase the speed at which images are rendered for display, many of the high-performance computer systems contain multiple processors. A parallel, multiple processor architecture typically stores individual copies of the entire MIP-map in each processor memory.

Thus, there is a need to efficiently implement large texture maps for display purposes so as to minimize attendant memory and data retrieval costs. Visual quality must not be sacrificed for memory savings. Final images in an improved texture mapping system need to be virtually indistinguishable from that of images generated by a traditional MIP-map approach.

There is also a need to maintain real-time display speeds even when navigating through displays drawn from large texture maps. For example, flight simulations must still be performed in real-time even when complex and voluminous source data such as satellite images of the earth or moon, are used to form large texture motifs.

SUMMARY OF THE INVENTION

The present invention pertains to an apparatus and method for providing texture by using selected portions of a texture MIP-map. The selected portions are referred to herein as a clip-map. Texel data relevant to a display image is stored, accessed, and updated efficiently in a clip-map in texture memory.

Entire texture MIP-maps are stored onto one or more mass storage devices, such as hard disk drives, optical disk drives, tape drives, CD drives, etc. According to the present invention, however, only a clip-map needs to be loaded into a more expensive but quicker texture memory (e.g., DRAM). Two dimensional or three dimensional texture data can be used. The clip-map is identified and selected from within a texture MIP-map based upon the display viewer's current eyepoint and field of view. The clip-map is composed of a set of selected tiles. Each tile corresponds to the respective portion of a texture level of detail map at or near the current field of view being rendered for display.

Virtually unlimited, large amounts of texture source data can be accommodated as texture MIP-maps in cheap, mass storage devices while the actual textured image displayed at any given time is readily drawn from selected tiles of corresponding clip-maps stored in one or more texture memories. In one example, the clip-map consists of only 6 million texels out of a total of 1.365 billion texels in a complete texture MIP-map—a savings of 1.36 billion texels! Where texture information is represented as a 8-bit color value, a texture memory savings of 10.9 gigabits (99.6%) is obtained.

According to another feature of the present invention, real-time flight over a large texture map is obtained through efficient updating of the selected clip-maps. When the eyepoint of a viewer shifts, the edges of appropriate clip-map tiles stored in the texture memory are updated along the direction of the eyepoint movement. New texel data for each clip-map tile is read from the mass storage device and loaded into the texture memory to keep the selected clip-map tiles in line with the shifting eyepoint and field of view. In one particularly efficient embodiment, when the eyepoint moves a distance equal to one texel for a particular LOD, one texel row of new texture LOD data is added to the respective clip-map tile to keep pace with the direction of the eyepoint movement. The texel row in the clip-map tile which encompasses texel data furthest from the moving eyepoint is discarded.

In a further feature of the present invention, a substitute texel value is used when an attempt is made to access a texel lying outside of a particular clip-map tile at the most appropriate resolution. The substitute texel value is obtained from the next coarser resolution clip-map tile which encompasses the texel being sought. The substitution texel that is chosen is the one closest to the location of the texel being accessed. Thus, this approach returns usable texel data from a clip-map even when mapping wayward pixels lying outside of a particular clip-map tile. Of course, for a given screen size, the tile size and tile center position can be calculated to guarantee that there would be no wayward pixels.

Finally, in one specific implementation of the present invention, texture processing is divided between a texture generator and a texture memory manager in a computer graphics raster subsystem. Equal-sized square tiles simplify texel addressing. The texture generator includes a LOD generation block for generating an LOD value identifying a clip-map tile for each pixel quad. A texture memory manager readily accesses the texel data from the clip-map using tile offset and update offset information.

Further embodiments, features, and advantages of the present inventions, as well as the structure and operation of the various embodiments of the present invention, are described in detail below with reference to the accompanying drawings.

BRIEF DESCRIPTION OF THE FIGURES

The accompanying drawings, which are incorporated herein and form a part of the specification, illustrate the present invention and, together with the description, further serve to explain the principles of the invention and to enable a person skilled in the pertinent art to make and use the invention.

In the drawings:

FIG. 4A shows a side view of the first six levels of a clip-map for photographic terrain texture in one example of the present invention.

FIG. 9 shows a raster subsystem including a texture processor having a texture generator and a texture memory manager according to the present invention.

FIG. 10 shows a block diagram of the texture generator in FIG. 9.

FIG. 11 shows a block diagram of the texture memory manager in FIG. 9.

Figure 1A:
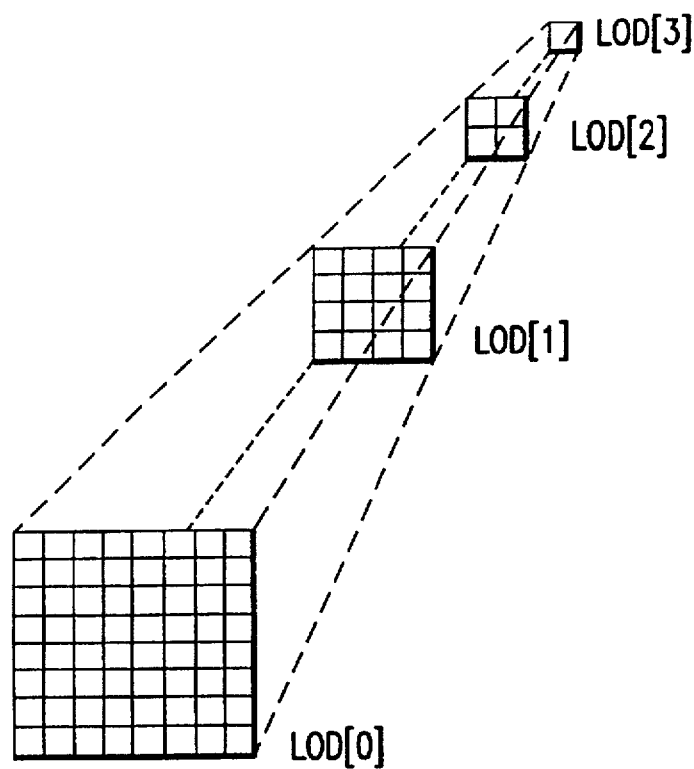
FIG. 1A shows a conventional multi-resolution MIP-map covering four levels of detail.

The present invention will now be described with reference to the accompanying drawings. In the drawings, like reference numbers indicate identical or functionally similar elements. Additionally, the left-most digit(s) of a reference number identifies the drawing in which the reference number first appears.

DETAILED DESCRIPTION OF THE PREFERRED EMBODIMENTS

I. Overview and Discussion

II. Terminology

III. Example Environment
IV. Computer Graphics System
V. Texture MIP-Mapping
VI. Selecting Portions of a Texture MIP-Map
VII. Photographic Terrain Texture
VIII. Updating the Clip-Map During Real-Time Operation
IX. Efficiently Updating the Clip-Map
X. Substitute Texel Data
XI. Overall Clip-Map Operation
XII. Specific Implementation
XIII. Square Clip-Map Tiles Example
XIV. Conclusion I. Overview and Discussion The present invention provides an apparatus and method for efficiently storing and quickly accessing texel data relevant for displaying a textured image. A large amount of texture source data is stored as a multi-resolution texture MIP-map on one or more mass storage devices. Only a relatively small clip-map representing selected portions of the complete texture MIP-map is loaded into faster, more expensive texture memory. These selected texture MIP-map portions include tiles which contain those texel values at each respective level of detail that are most likely to be mapped to pixels being rendered for display.

When the eyepoint or field of view is changed, the tiles stored in the texture memory are updated accordingly. In one efficient embodiment for updating the clip-map in real-time, new texel data is read from the mass storage device and loaded into the fringes of tiles to track shifts in the eyepoint. To maintain the size of the clip-map, tile texel data corresponding to locations furthest away from a new eyepoint is discarded. Anomalous attempts to access a texel lying outside of a particular clip-map tile are accommodated by utilizing a substitute texel value obtained from the next coarser resolution clip-map tile which encompasses the texel being sought.

II. Terminology

To more clearly delineate the present invention, an effort is made throughout the specification to adhere to the following term definitions as consistently as possible.

The term "texture map" refers to source data representing a particular texture motif at its highest resolution. A "texture MIP-map" and equivalents thereof such as a "MIP-map of texel data" are used to refer to conventional multum in parvo MIP-map representations of a texture map at successive multiple levels of details (LOD), that is, varying degrees of resolution.

On the other hand, "clip-map" is used to refer to portions of a MIP-map selected according to the present invention. Thus, a clip-map is a multi-resolution map made up of a series of tiles wherein at least some of the tiles represent smaller, selected portions of different levels of detail in a MIP-map. When two-dimensional texture data sets are used, these tiles are two-dimensional texel arrays. When three-dimensional texture data sets are used, these tiles are three-dimensional texel arrays, i.e. cubes.

Finally, texel array dimensions are given in convenient 1k×1k, 2k×2k, etc., shorthand notation. In actual implementations using digital processing, 1k equals 1,024, 2k equals 2,048, etc.

III. Example Environment

The present invention is described in terms of a computer graphics display environment for displaying images having textures drawn from multi-resolution texture MIP-maps. Moreover, sophisticated texture motifs covering a large area, such as satellite data and aerial photographs, are preferred to fully exploit the advantages of the clip-map system and method described herein. As would be apparent to a person skilled in the pertinent art, the present invention applies generally to different sizes and types of texture patterns limited only by the imagination and resources of the user.

Although the present invention is described herein with respect to two-dimensional texture mapping, the present invention can be extended to three-dimensional texture mapping when the requisite additional software and/or hardware resources are added. See e.g. the commonly-assigned, U.S. patent application Ser. No. 08/088,716, now U.S. Pat. No. 5,490,240 (Attorney Docket No. 15-4-99.00 (1452.0140000), filed Jul. 9, 1993, entitled "A System and Method of Generating Interactive Computer Graphic Images Incorporating Three Dimensional Textures," by James L. Foran et al. (incorporated herein by reference in its entirety).

IV. Computer Graphics System

Figure 2:
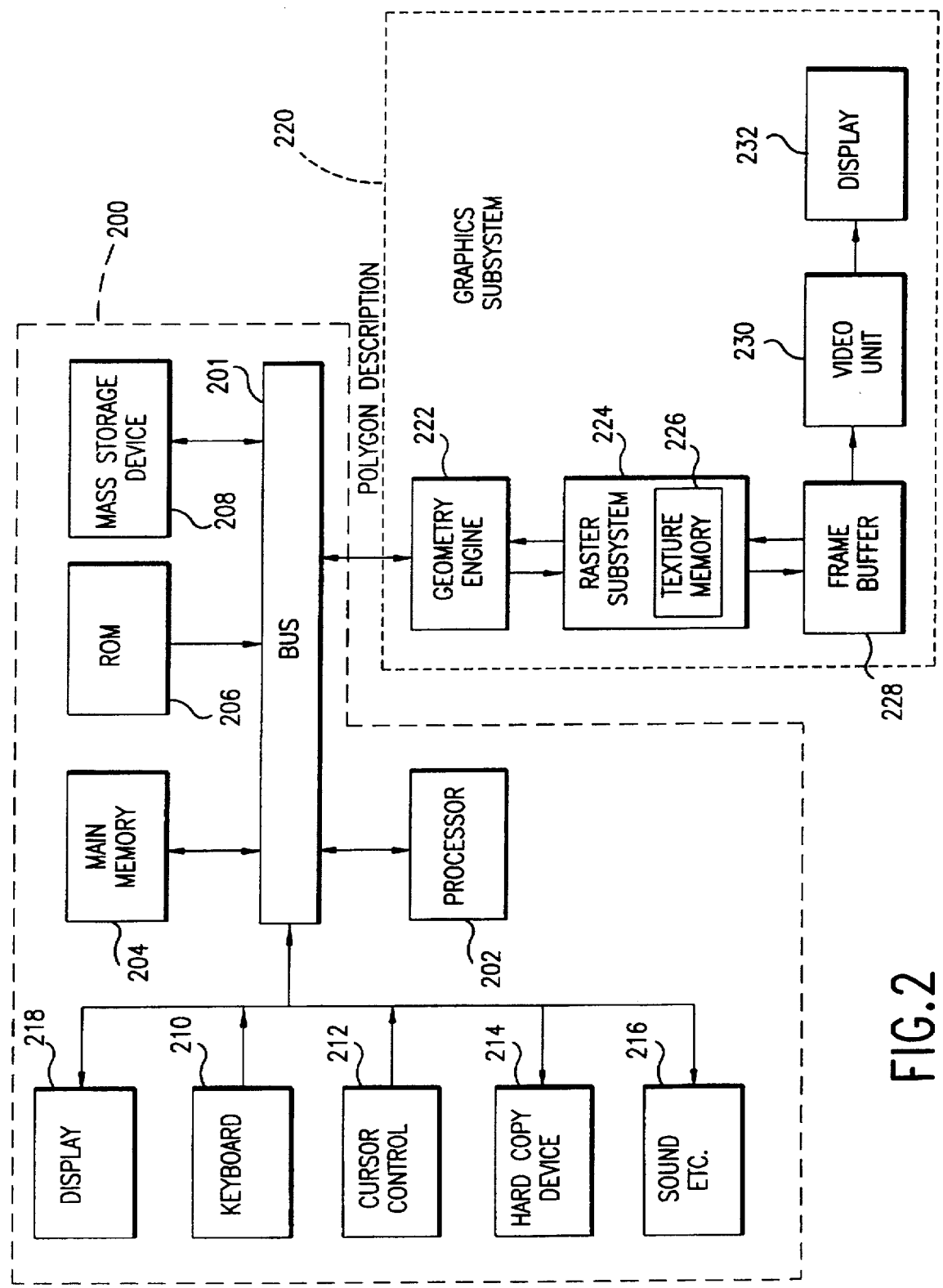
FIG. 2 shows a block diagram of an example computer graphics system implementing the present invention.

Referring to FIG. 2, a block diagram of a computer graphics display system 200 is shown. System 200 drives a graphics subsystem 220 for generating textured display images according to the present invention. In a preferred implementation, the graphics subsystem 220 is utilized as a high-end, interactive computer graphics workstation.

System 200 includes a host processor 202 coupled through a data bus 201 to a main memory 204, read only memory (ROM) 206, and mass storage device 208. Mass storage device 208 is used to store vast amounts of digital data relatively cheaply. For example, the mass storage device 208 can consist of one or more hard disk drives, floppy disk drives, optical disk drives, tape drives, CD ROM drives, or any number of other types of storage devices having media for storing data digitally.

Different types of input and/or output (I/O) devices are also coupled to processor 202 for the benefit of an interactive user. An alphanumeric keyboard 210 and a cursor control device 212 (e.g., a mouse, trackball, joystick, etc.) are used to input commands and information. The output devices include a hard copy device 214 (e.g., a laser printer) for printing data or other information onto a tangible medium. A sound recording or video option 216 and a display screen 218 can be coupled to the system 200 to provide for multimedia capabilities.

Graphics data (i.e. a polygonal description of a display image or scene) is provided from processor 202 through data bus 201 to the graphics subsystem 220. Alternatively, as would be apparent to one skilled in the art, at least some of the functionality of generating a polygonal description could be transferred to the computer graphics subsystem as desired.

Processor 202 also passes texture data from mass storage device 208 to texture memory 226 to generate and manage a clip-map as described below. Including the software and/or hardware in processor 202 for generating and managing clip-maps is one example for implementing the present invention. Separate modules or processor units for generating and managing a texture clip-map could be provided along data bus 201 or in graphics subsystem 220, as would be apparent to one skilled in the art considering this description.

The graphics subsystem 220 includes a geometry engine 222, a raster subsystem 224 coupled to a texture memory 226, a frame buffer 228, video board 230, and display 232.

Processor 202 provides the geometry engine 222 with a polygonal description (i.e. triangles) of a display image in object space. The geometry engine 222 essentially transforms the polygonal description of the image (and the objects displayed therein) from object space (also known as world or global space) into screen space.

Raster subsystem 224 maps texture data from texture memory 226 to pixel data in the screen space polygonal description received from the geometry engine 222. Pixel data and texture data are eventually filtered, accumulated, and stored in frame buffer 228. Depth comparison and other display processing techniques can be performed in either the raster subsystem 224 or the frame buffer 228. Video unit 230 reads the combined texture and pixel data from the frame buffer 228 and outputs data for a textured image to screen display 232. Of course, as would be apparent to one skilled in the art, the output image can be displayed on display 218, in addition to or instead of display 232. The digital data representing the output textured display image can also be saved, transmitted over a network, or sent to other applications.

The present invention is described in terms of this example high-end computer graphics system environment. Description in these terms is provided for convenience only. It is not intended that the invention be limited to application in this example environment. In fact, after reading the following description, it will become apparent to a person skilled in the relevant art how to implement the invention in alternative environments.

V. Texture MIP-Mapping

In the currently preferred embodiment of the present invention, large texture maps are stored on one or more mass storage devices 208. A MIP-map representation of the texture maps can either be pre-loaded onto the mass storage device 208 or can be computed by the processor 202 and then stored onto mass storage device 208. Two-dimensional or three-dimensional texture data sets are accommodated.

As is well-known in computer graphics design, the filtering and MIP-structure development necessary to derive and efficiently store the successive levels of detail for a texture MIP-map can be effectuated off-line prior to run-time operation. In this way, high-quality filtering algorithms can be utilized over a large texture map or database without hindering on-line image display speed and performance. Alternatively, if a less flexible but fast approach is acceptable, hardware can be used to produce the successive coarser levels of detail directly from input texture source data.

Under conventional texture mapping techniques, even if texture data were to be accessed from a remote, large texture MIP-map, the rendering of a textured image for display in real-time would be impractical, if not impossible. The present invention, however, realizes the advantages of accommodating large texture MIP-maps in one or more mass storage devices 208 without reducing texture access time. A relatively small clip-map representing only selected portions of a complete texture MIP-map is stored in a texture memory 226 having a fast rate of data return. In this way, texture memory 226 acts as a cache to provide texture rapidly to the raster subsystem 224.

This hierarchical texture mapping storage scheme allows huge texture MIP-maps to be stored rather inexpensively on the mass storage device 208. Based on the viewer eye point and/or field of view, only selected portions of a texture MIP-map corresponding to the texture motif to be rendered for display need to be loaded into the texture memory 226. In this manner, large 2-D or 3-D texture MIP-maps can be used to provide texture rather inexpensively, yet the textured images can be rendered in real-time.

VI. Selecting Portions of a Texture MIP-Map

Figure 3:
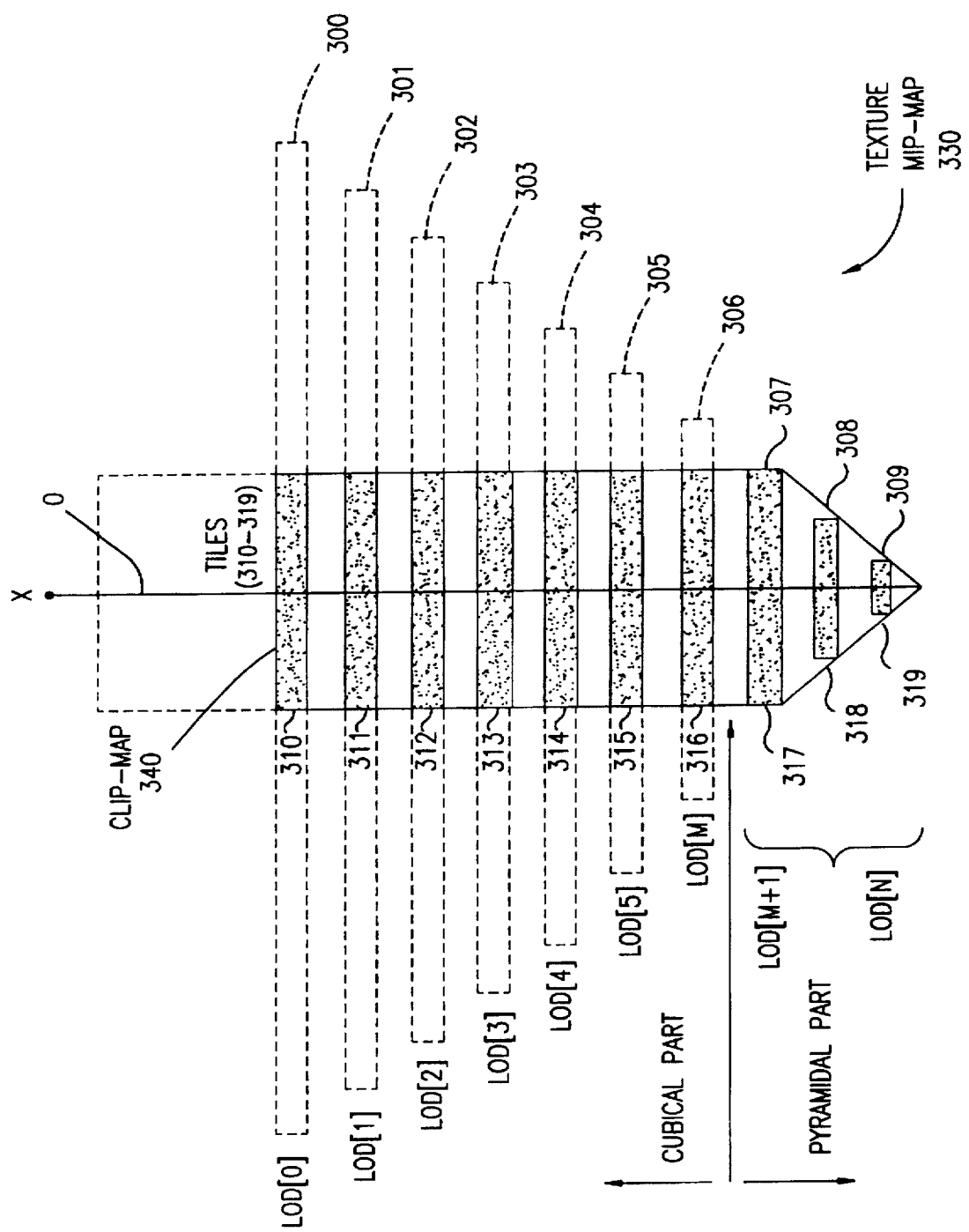
FIG. 3 shows a side view of a ten-level texture MIP-map and the selected tiles that constitute a clip-map according to the present invention.

The process for determining which portions of a complete texture MIP-map are to be loaded from mass storage devices 208 into texture memory 226 to form a clip-map will now be described in more detail. FIG. 3 shows a side view of a complete texture MIP-map 330 having ten conventional levels of details (not shown to actual geometric scale). The levels of detail 300 to 309 each correspond to successively coarser resolutions of a texture map. The highest level of detail LOD[0] corresponds to the finest resolution texel map 300. Each subsequent level of detail map 301 to 309 are filtered to have half the resolution of the preceding level of detail. Thus, each coarser level of detail covers an area of the texture map four times greater than the preceding level of detail.

FIG. 3 further illustrates the selected portions of the texture MIP-map 330 constituting a clip-map 340 according to the present invention. Clip-map 340 consists of relatively small tiles 310–319 which are regions of the levels of detail maps 300–309. The actual size and shape of these tiles depends, inter alia, on the eye point and/or field of view of the display viewer. Each of these tiles must substantially encompass a potential field of view for a display view. To simplify addressing and other design considerations, equal-sized square tiles, i.e. square texel arrays, are used which can each be addressed relative to a common, fixed central eye point X and a center line O running through the clip map. For 3-D texture, square cubes consisting of a 3-D texel array are used.

Clip-map 340 essentially consists of a set of tiles, including a cubical part (310–316) and a pyramidal part (317–319). The cubical part consists of a shaft of tiles (310–316) of equal size. In the pyramidal part, the tiles consist of the actual level of detail maps (LOD[M+1]-LOD[N]). The pyramidal part begins at the first level of detail map (LOD[M+1]) which is equal to or smaller than a tile in the cubical part and extends down to a 1×1 texel (LOD[N]).

The reduced memory requirements for storing a clip-map instead of a complete texture MIP-map are clear. A complete, conventional 2-D texture MIP-map having dimensions given by "size in s" and "size in t" uses at least the following memory M:

$$M_{Texture\ MIP-map} = 4/3 * (\text{size in s}) * (\text{size in t}) * \text{texel size (in bytes)}.$$

The smaller, clip-map example having equal-sized, square tiles in the cubical part only uses the following memory M:

$$M_{Texture\ clip-map} = [(\text{number of levels in cubical part} * (\text{tile size })^2) + 4/3 * (\text{size in s of pyramidal part}) * (\text{size in t of pyramidal part})] * \text{texel size (in bytes)}.$$

Ten levels of detail are shown in FIG. 3 to illustrate the principle of the present invention. However, a smaller or greater number of levels of detail can be utilized. In a preferred example of the present invention, 16 levels of detail are supported in a high-end interactive computer graphics display workstation.

VII. Photographic Terrain Texture

Substantial reductions in memory costs and great improvements in real-time display capability are immediately realized by using a clip-map to render textured images. These advantages are quite pronounced when large texture maps such as a photographic terrain texture are implemented.

For example, source data from satellites covering 32 or more square kilometers of a planet or lunar surface is available. Such terrain can be adequately represented by a photographic texture MIP-map 430 having sixteen level of detail maps. The six highest resolution LOD maps 400–405 and tiles 410–415 are shown in FIG. 4A. The highest resolution level LOD[0] consists of a 32k×32k array of texels. Successive level of details LOD[1]-LOD[5] correspond to the following texel array sizes: 16k×16k, 8k×8k, 4k×4k, 2k×2k, and 1k×1k. The remaining pyramidal part not shown consists of texel arrays 512×512, 256×256, . . . 1X1. Thus, a total of 1.365 billion texels must be stored in mass storage device 208.

The size of the clip-map, however, is a function of the field of view and how close the observer is to the terrain. Generally, a narrow field of view requires a relatively small tile size increasing the memory savings. For example, the higher resolutions in the cubical part of clip-map 440 need only consist of 1k×1k tiles 410–414 for most close perspective images. The entire clip-map 440 then contains 6 million texels—a savings of 1.36 billion texels! Where texture information is represented as a 8-bit color value, a memory savings of 10.9 gigabits (99.6%) is obtained.

By storing the smaller clip-map 440 in texture memory 226, further advantages inherent in a hierarchial memory system can be realized. The complete texture MIP-map 430 of 1.365 billion texels can be stored in cheap mass storage device 208 while the small clip-map 440 is held in a faster texture memory 226, such as DRAM or SRAM. Sophisticated texel data can then be used to render rich textured images in real-time from the easily-accessed clip-map 440. For example, a screen update rate of 30 to 60 Hz, i.e. 1/30 to 1/60 sec., is realized. The transport delay or latency of 1 to 3 frames of pixel data is approximately 10 to 50 msec. The above screen update rates and latency are illustrative of a real-time display. Faster or slower rates can be used depending on what is considered real-time in a particular application.

Figure 4B:
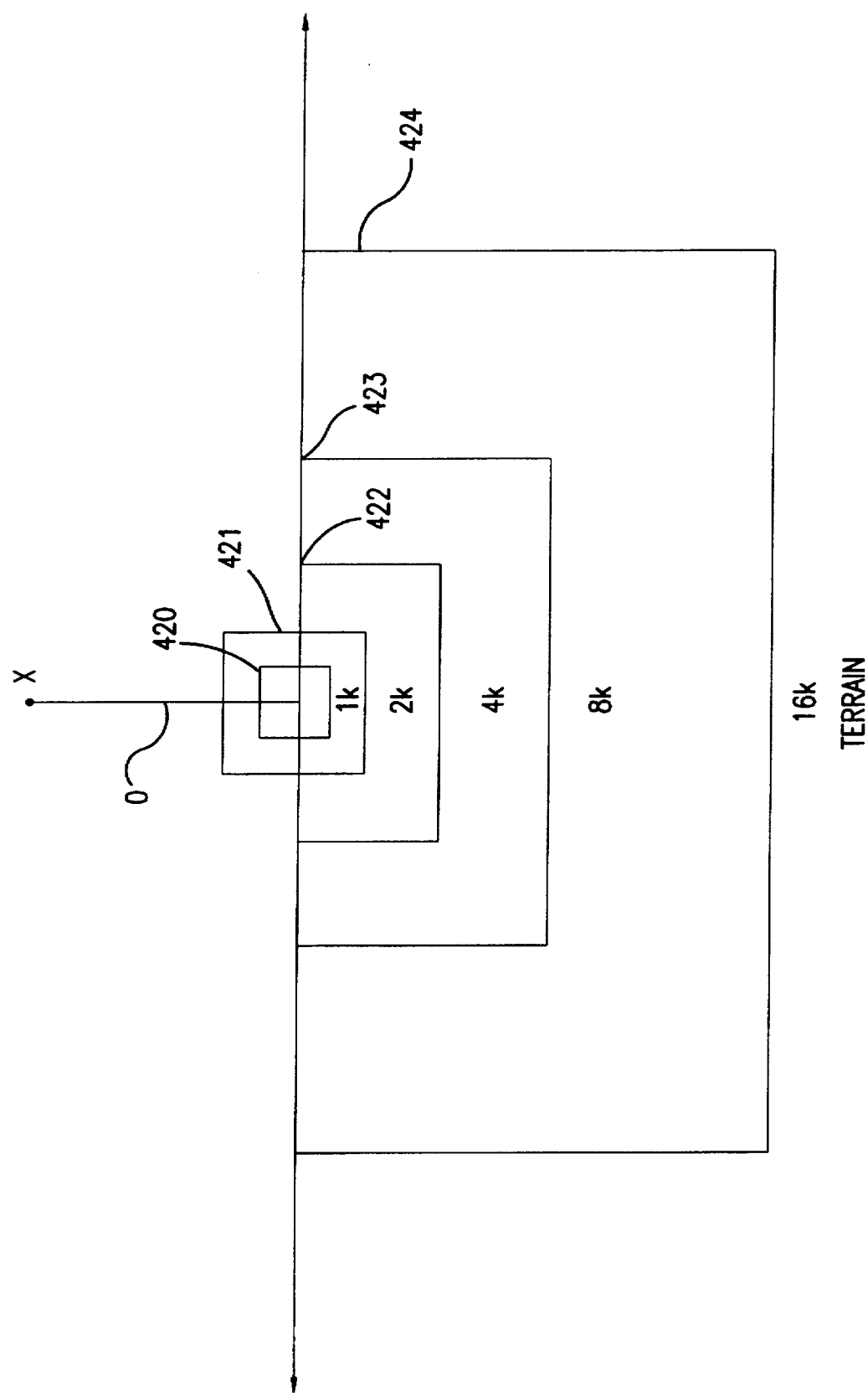
FIG. 4B shows the progressively larger areas of a terrain texture covered by coarser tiles in the present invention.

As shown in FIG. 4B, the texel data stored in clip-map 440 can provide texture over a large display image area. For example, each high resolution texel of LOD[0] in a 32k×32k texel array can cover one square meter of geographic area in the display image. The 1k×1k tile 410 contains texel data capable of providing texture for a display image located within one square kilometer 420.

Figure 1B:
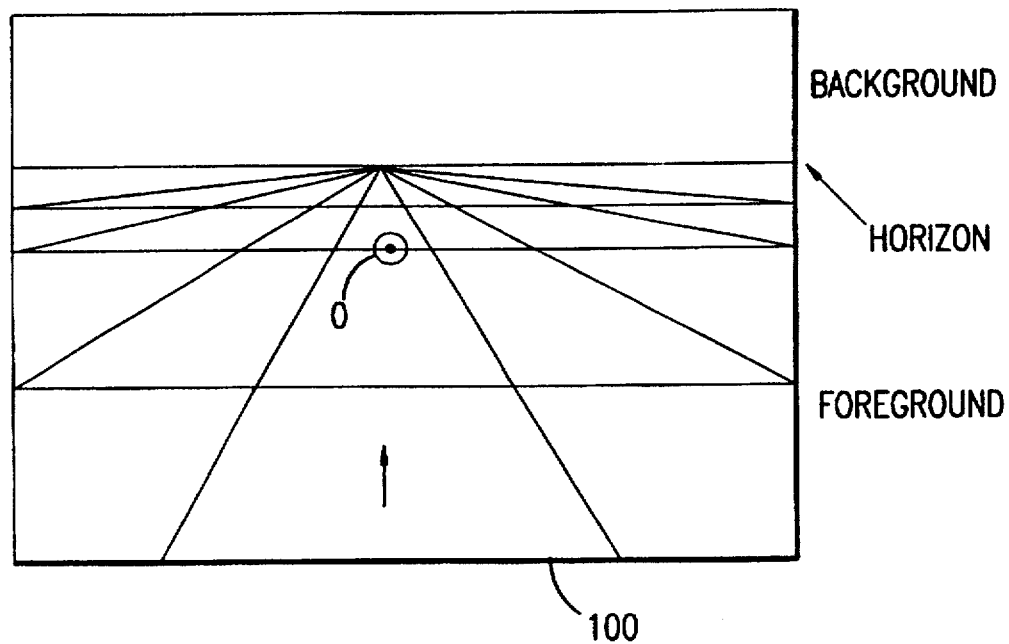
FIG. 1B shows a conventional example of a polygon perspective of a landscape to which texture MIP-mapping can be applied.

Moreover, typical images are displayed at a perspective as described with respect to FIG. 1B. The highest texel resolution included in tile 410 need only be used for the smaller areas magnified in a foreground region. Because of their progressively coarser resolution, each successive tile 411–414 covers the following broader areas 4 square kilometers (421), 16 square kilometers (422), 64 square kilometers (423), and 256 square kilometers (424), respectively. The complete 1,024 square kilometer area covered by texel data in tile 415 is not shown due to space limitations.

Figure 4C:
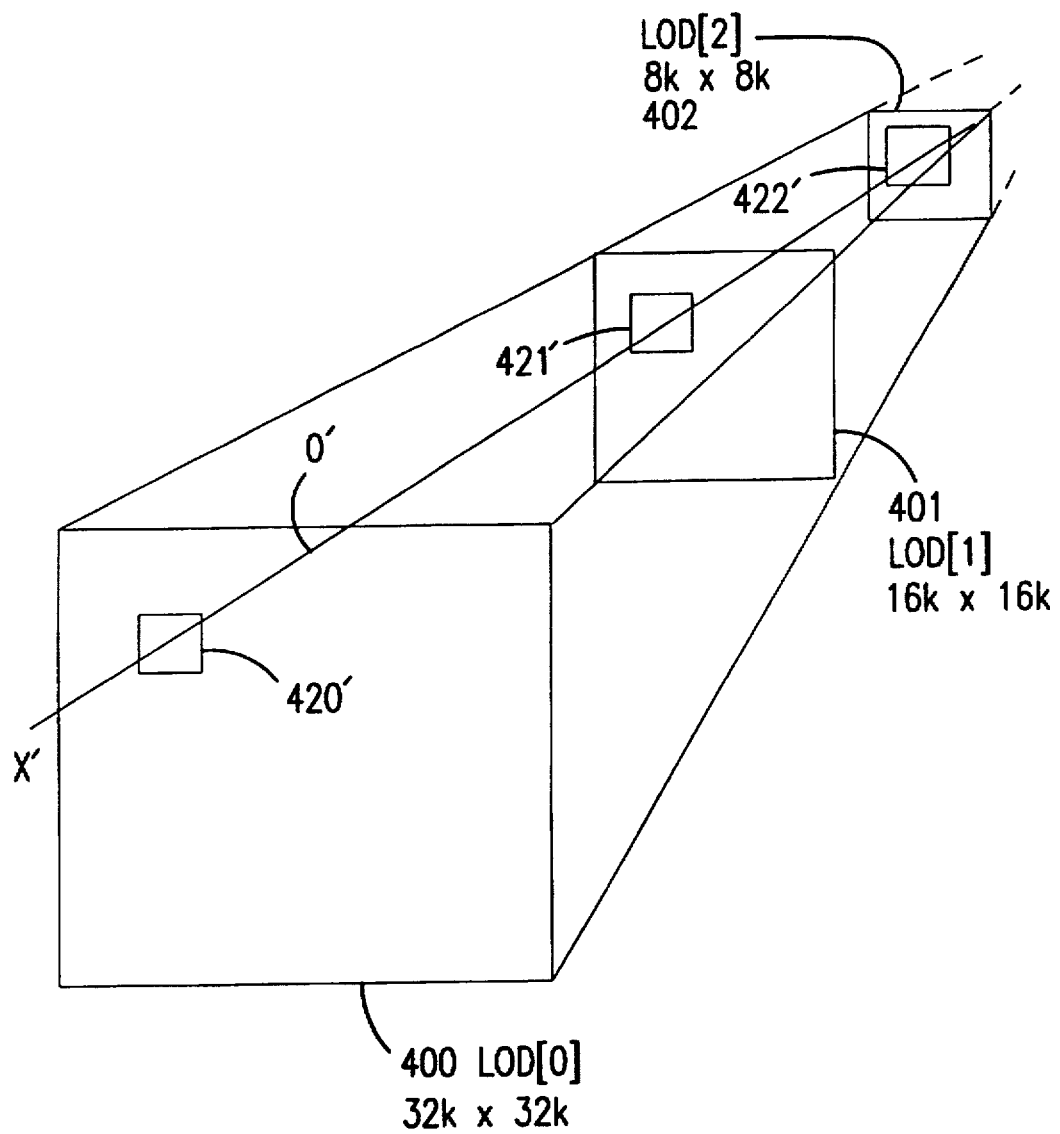
FIG. 4C shows three LOD-maps and associated clip-map tile areas relative to an observer's field of view.

Even though the tiles may be equal-sized texel arrays, each tile covers a geometrically large area of a texture map because of filtering, albeit at a coarser level of detail. FIG. 4C shows a perspective view of regions 420' to 422' covered by tiles 410 to 412 within the respective first three level of detail maps 400 to 402. Each of the regions 420' to 422' are aligned along a center line O' stemming from an eyesight location X' to the center of the coarsest 11X1tile (not shown) in the pyramidal part of the clip-map 440.

Thus, the clip-map 440 contains sufficient texel data to cover larger minified areas in the background of a display where coarser texture detail is appropriate. As a result, high quality textured display images, in perspective or warped, are still obtained for large texture patterns by using texel data from a clip-map.

VIII. Updating the Clip-Map During Real-Time Operation

The discussion thus far has considered only stationary eyepoints (X or X'). Many graphics display applications, such as flight applications over a textured terrain, present a constantly changing display view. As is well-known in graphics design, the display view can simulate flight by constantly moving the eyepoint along a terrain or landscape being viewed. Such flight can be performed automatically as part of a program application, or manually in response to user input such as mouse or joystick movement. Hyperlinks or jumps can be selected by a user to abruptly select a new viewpoint and/or field of view.

Regardless of the type of movement, today's user demands that new views be displayed in real-time. Delays in mapping texture data directly from large texture maps are intolerable. Reloading an entire new texture MIP-map for a new display viewpoint is often impractical.

Figure 5:
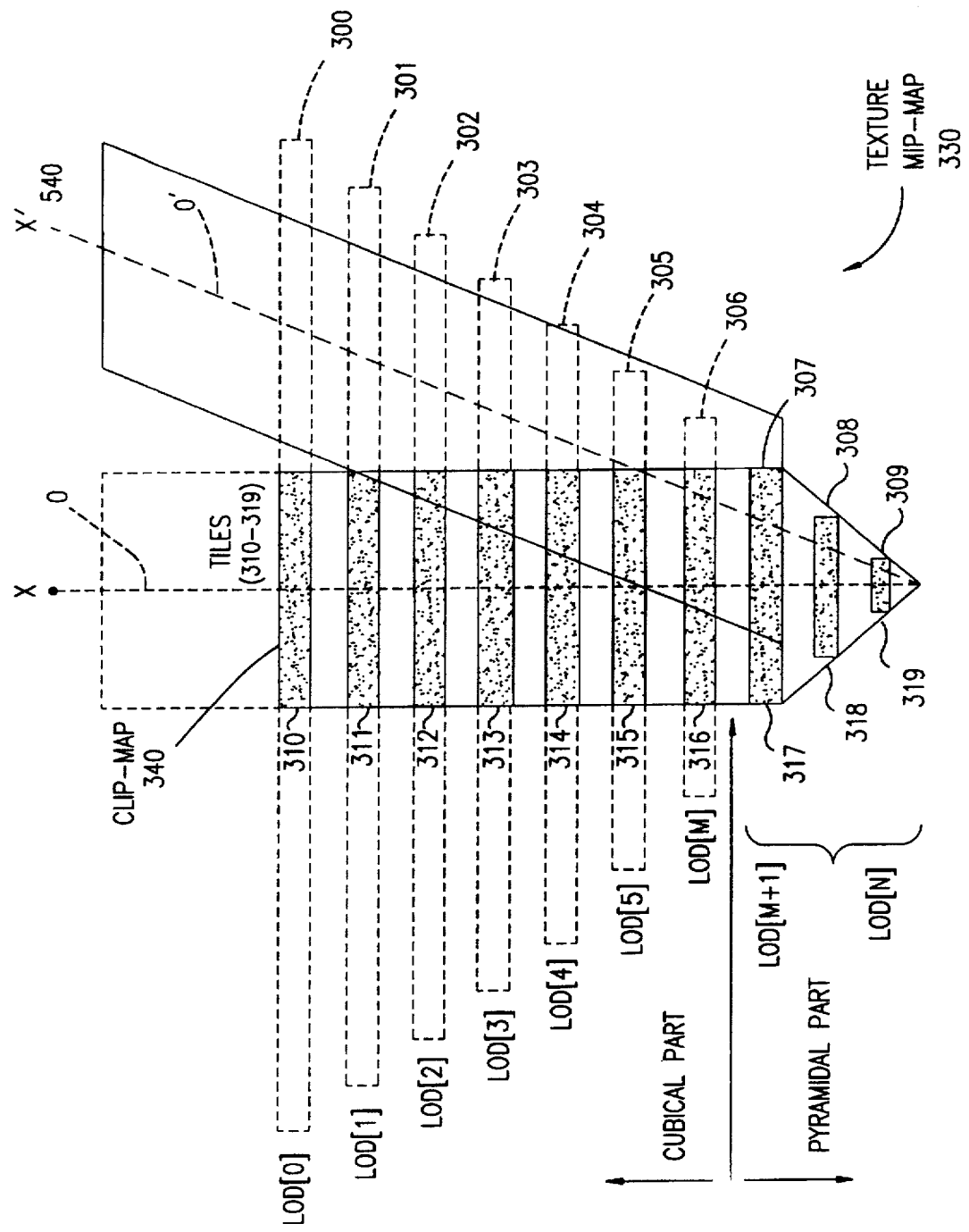
FIG. 5 shows the shifting of selected tiles in a clip-map to track a change in the viewer eyepoint.

As shown in FIG. 5, when the eyepoint X shifts to a new point X' for a new display view, the texel data forming the clip-map 340 must similarly shift to track the new field of view along the axis O'. According to one feature of the present invention, portions of the texture MIP-map 330 forming a new "slanted" clip-map 540 are loaded into the texture memory 226. The "slanted" clip-map 540 is necessarily drawn in a highly stylized and exaggerated fashion in FIG. 5 in the interest of clarity. Actual changes from one display view to the next are likely less dramatic. The actual tiles in the slanted clip-map would also be more staggered if the level of detail maps were drawn in true geometric proportion.

New tiles can be calculated and stored when the eyepoint and/or field of view changes to ensure that clip-map 540 contains the texel data which is most likely to be rendered for display. Likewise, the size and/or shape of the tiles can be altered to accommodate a new display view.

Texel data can be updated by loading an entire new slanted clip-map 540 from mass storage device 208 into texture memory 226. Full texture loads are especially helpful for dramatic changes in eyepoint location and/or field of view.

IX. Efficiently Updating the Clip-Map

According to a further feature of the present invention, subtexture loads are performed to efficiently update texel data at the edges of tiles on an on-going basis. For example, as the eyepoint shifts, a new row of texel data is added to a tile in the direction of the eyepoint movement. A row located away from a new eyepoint location is discarded. Coarser tiles need not be updated until the eyepoint has moved sufficiently far to require a new row of texel data. Thus, the relatively small amount of texel data involved in a subtexture loads allows clip-map tiles to be updated in real-time while maintaining alignment with a moving eyepoint X.

Figure 6B:
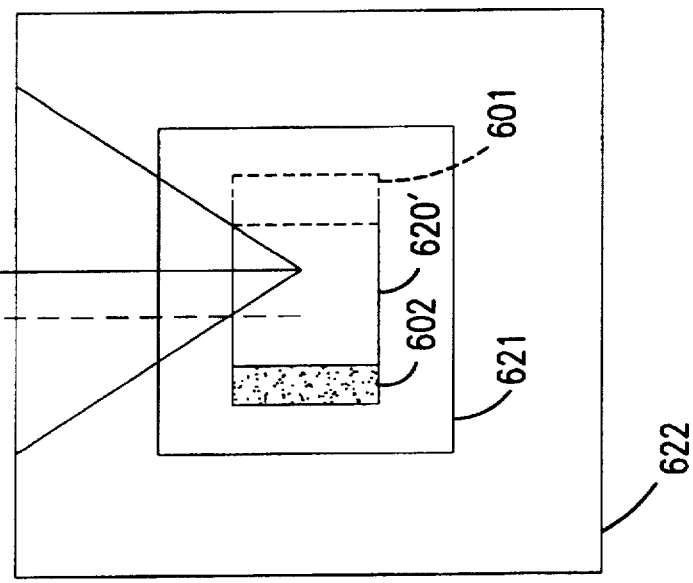
FIGS. 6A and 6B illustrate an efficient updating of clip-map tiles according to the present invention to follow eyepoint changes.
Figure 6A:
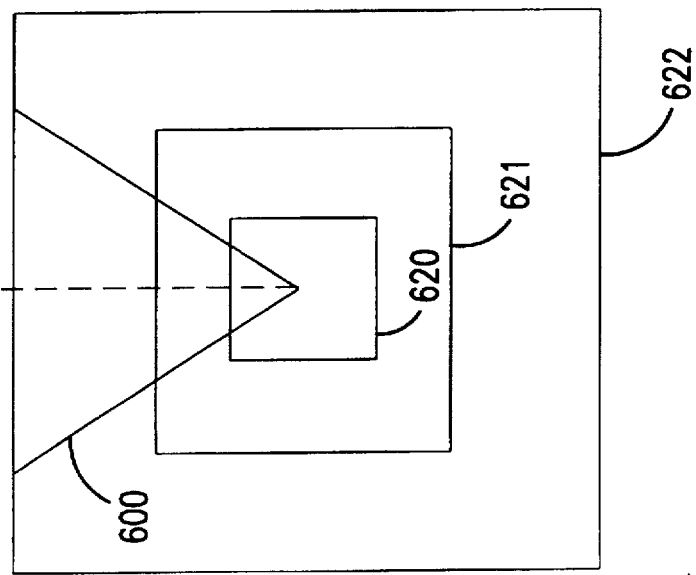

For example, FIGS. 6A and 6B illustrate, respectively, the areas of texel data covered by clip-map tiles before and after a subtexture load in the highest resolution tile 410. Each of the areas 620 to 622 correspond to the regions of a texture map covered by 1k×1k tiles 410–412, as described earlier with respect to the terrain of FIG. 4B. A field of view 600 along the direction O marks the display area which must be covered by texture detail. Hence, only those texels residing within triangle 600 need to be stored or retained in the texture memory 226. Texels around the fringes of triangle 600, of course, can be added to provide additional texture data near the edges of a display image.

As shown in FIG. 6B, each time the eyepoint advances one pixel-width (the pixel-width is exaggerated relative to the overall tile size to better illustrate the updating operation), a new texel row 601 located forward of the eyepoint is loaded from mass storage device 208 into the highest resolution tile 410 in texture memory 226. The texel row 602 furthest from the new eyepoint X' is then discarded. In this way, tile 410 contains texel data for an area 620' covering the new display area 600. For small changes, then, coarser tiles (411, 412, etc.) do not have to be updated. Because an equal amount of texels are discarded and loaded, the tile size (and amount of texture memory consumed by the clip-map) remains constant.

When the eyepoint moves a greater distance, texture data is updated similarly for the tiles at coarser LODs. Because two texels from an LOD are filtered to one texel in each direction s or t in texture space to form a successive LOD, the minimum resolution length for each LOD[n] is $2^n$ pixels, where n=0 to N. Accordingly, the tiles for LOD[1], LOD[2] ... LOD[4] in the cubical part of a clip-map 440 are only updated when the eyepoint has moved two, four, eight, and sixteen pixels respectively. Because each level of detail in the pyramidal part is already fully included in the tile 415, no updating is necessary in theory. To simplify an updating algorithm, however, when tiles in either the cubical part or the pyramidal part reach the end of a level of detail map, garbage or useless data can be considered to be loaded. Substitute texel data drawn from a coarser tile would be used instead of the garbage data to provide texture detail in those regions.

According to the present invention, then, the amount of texel data which must be loaded at any given time to update clip-map 540 is minimal. Real-time display operation is not sacrificed.

Texel data can be updated automatically and/or in response to a user-provided interrupt. Subtexture loads are further made in advance of when the texel data is actually rendered for display.

Finally, a check can be made to prevent attempts to draw an image using texel data which is being updated. Fringe regions are defined at the edges of tiles in the cubical part of the clip-map. The fringes include at least those texels being updated. To better accommodate digital addressing, it is preferred that the fringes consist of a multiple of eight texels. For example, in a 1k×1k tile having 1,024 texels on a side, eight texels at each edge form the fringe regions leaving 1,008 texels available to provide texture. Any attempt to access a texel in the fringe is halted and a substitute texel from the next coarsest level of detail is used instead. In this way, accesses by the raster subsystem 224 to specific texel data do not conflict with any texel updating operation.

X. Substitute Texel Data

According to a further feature of the present invention, substitute texel data is returned for situations where pixel data lying outside of a clip-map tile at a desired level of detail is to be mapped. When the raster subsystem 224 seeks to map a pixel not included in a clip-map tile corresponding to the desired level of detail, there is a problem in that the texture memory 226 cannot provide texel data at the most appropriate resolution at that particular pixel. The likelihood of such a situation arising can be minimized by brutishly mandating larger tile sizes. Of course, for a given screen size, the tile size and center position can be calculated to guarantee that there would be no wayward pixels.

Figure 7:
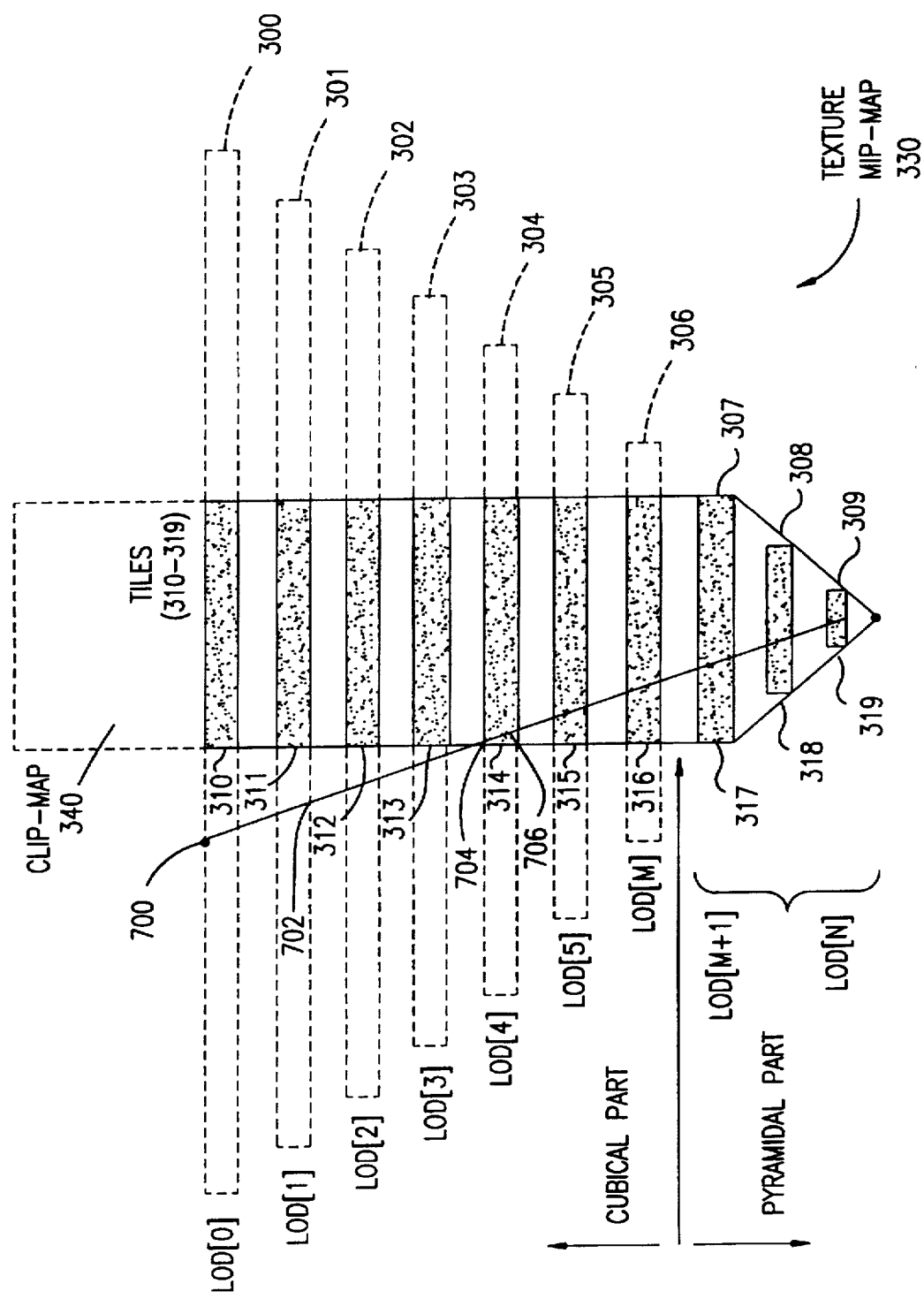
FIG. 7 shows obtaining a substitute texel value from the next closest clip-map tile having the highest resolution according to the present invention.

The inventors, however, have discovered a more elegant solution which does not require an unnecessary expansion of the clip-map to accommodate wayward pixels. As shown in FIG. 7, substitute texel data is derived for a pixel 700 lying outside of a clip-map 340. A line 702 is first determined between the out-of-bounds pixel 700 and the apex of the pyramid part (center of the coarsest 1×1 texel tile LOD[N]). At some point 704, this line 702 intersects the shaft of the clip-map. Substitute texel data 706, covering pixel 700, is then drawn from the nearest, coarser tile 314.

In practice, when the resolution between levels of detail varies by a factor of 2, substitute texel data is easily drawn from the next coarser level of detail by shifting a texel address one bit. Operations for obtaining memory addresses for a texel located in a clip-map tile at the desired level of detail are further described below. Arithmetic and shifting operations to obtain a substitute texel memory address from the tile at the next nearest level of detail which covers the sought pixel is also described below.

By returning substitute texel having the next best level of detail, the overall texture detail remains rich as potential image degradation from pixels lying outside the clip-map is reduced. Moreover, by accommodating wayward pixels, greater latitude is provided in setting tile size, thereby, reducing the storage capacity required of texture memory 226.

XI. Overall Clip-Map Operation

Figure 8A:
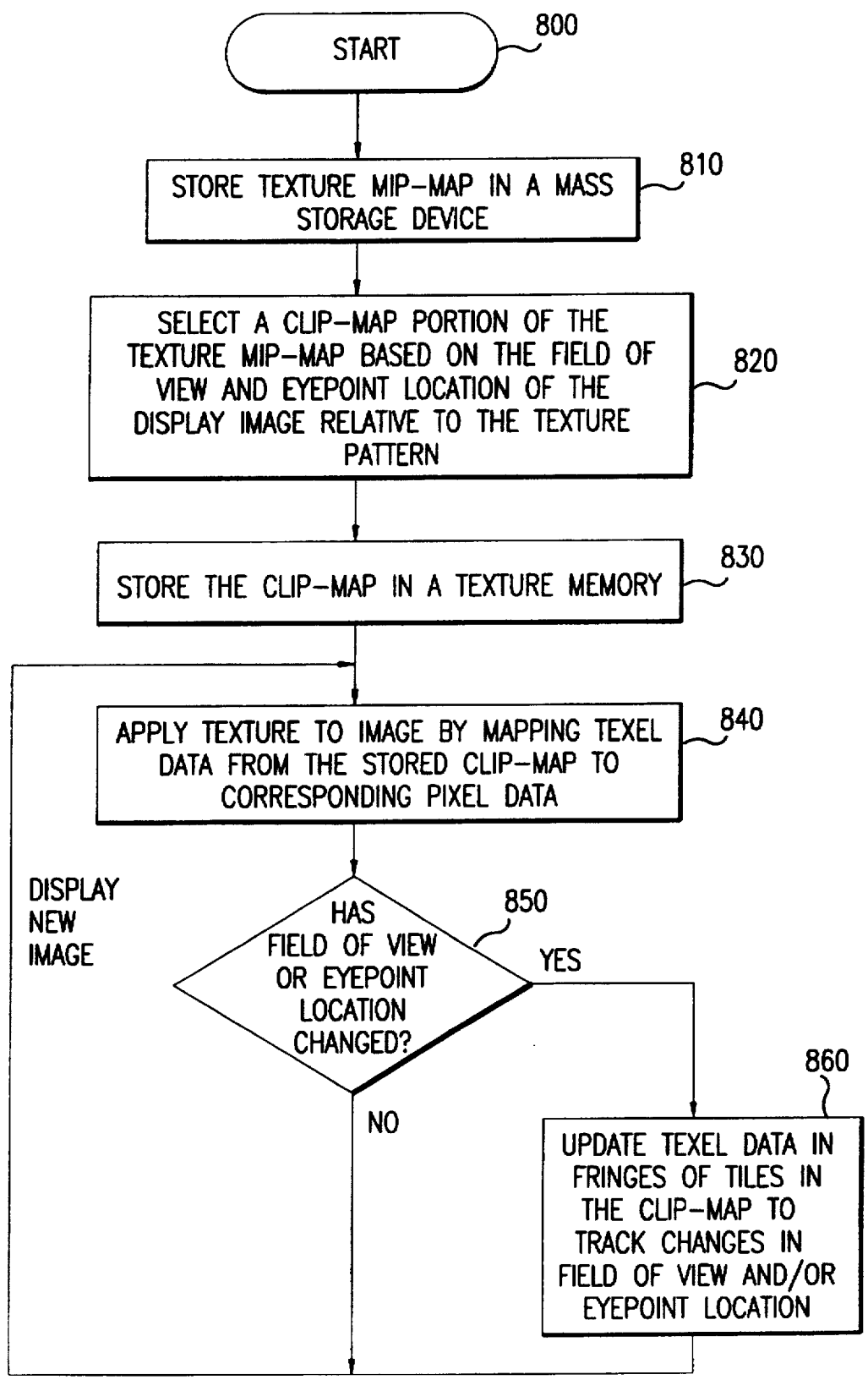
FIGS. 8A and 8B are flowcharts describing steps for obtaining a textured display image using a texture clip-map according to the present invention.
Figure 8B:
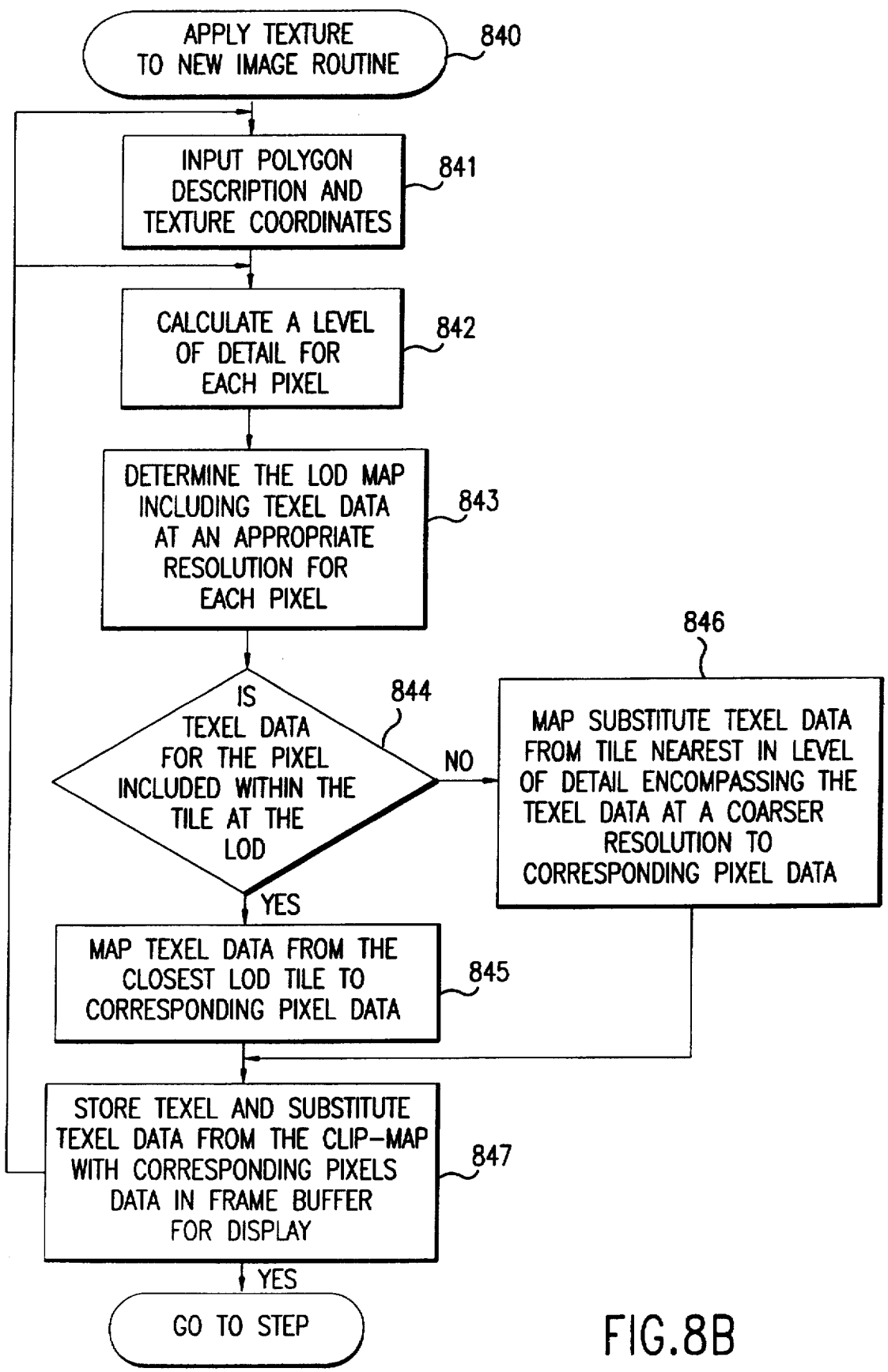

FIGS. 8A and 8B are flowcharts illustrating the operation of the present invention in providing texture data from a clip-map to display images.

First, a texture MIP-map representation of a texture map is stored in an economical memory such as, a mass storage device 208 (step 810). Processor 202 can perform pre-filtering to calculate a texture MIP-map based on a texture map supplied by the user. Alternatively, the texture MIP-map can be loaded and stored directly into the mass storage device 208.

Portions of the MIP-maps are then selected based on a particular field of view and/or eyepoint location to form a clip-map (step 820). The clip-map is stored in a faster texture memory 226 (step 830). Using texel data stored in the clip-map, texture can be mapped quickly and efficiently to corresponding pixel data to display a new textured image (step 840).

To track changes in the field of view and/or eyepoint location of a display view, only the fringes of the tiles in the clip-map are updated (steps 850 and 860). Such subtexture loads can be performed in real-time with minimal processor overhead. Unlike conventional systems, an entire texture load operation need not be performed.

FIG. 8B shows the operation in step 840 for processing texture for a new image in greater detail. In step 841, a description of polygonal primitives and texture coordinates is input. Triangle vertices are typically provided in screen space by a geometry engine 222. A raster subsystem 224 then maps texture coordinates at the vertices to pixels.

Texture coordinates can be calculated for two-dimensional or three-dimensional texture LOD maps.

In step 842, an appropriate level of detail is calculated for each pixel according to standard LOD calculation techniques based on the pixel dimension and texel dimension. A level of detail map closest to this appropriate level of detail is determined for the pixel (step 843).

Texture closest to the appropriate level of detail is then obtained from the finest resolution tile in the clip-map which actually encompasses a texel corresponding to the pixel (steps 844 to 847). First, a check is made to determine whether texel data for the pixel is included within a tile corresponding to the appropriate level of detail map determined in step 843. Because the tiles are determined based on eyepoint location and/or field of view, texel data for a pixel is likely found within a tile at an appropriate level of detail. In this case, a texel is accessed from the corresponding tile and mapped to a corresponding pixel (step 845).

As described earlier with respect to FIG. 7, when a texel at the appropriate level of detail is not included within a corresponding tile, a coarser substitute texel is accessed. The substitute texel is chosen from the tile at the nearest level of detail which encompasses the originally-sought texel (step 846). Texels mapped to pixels in step 845 and substitute texels mapped to corresponding pixels in step 846 are accumulated, filtered, and stored in a frame buffer 228 for subsequent display (step 847).

Steps 841 to 847 are repeated for each input polygon description until a complete display image has been mapped to texel data and stored in the frame buffer 228.

As would be apparent to one skilled in computer-generated textured graphics, the "clip-map" process described with respect to FIGS. 8A and 8B, can be carried out through firmware, hardware, software executed by a processor, or any combination thereof.

XII. Specific Implementation

Figure 9:
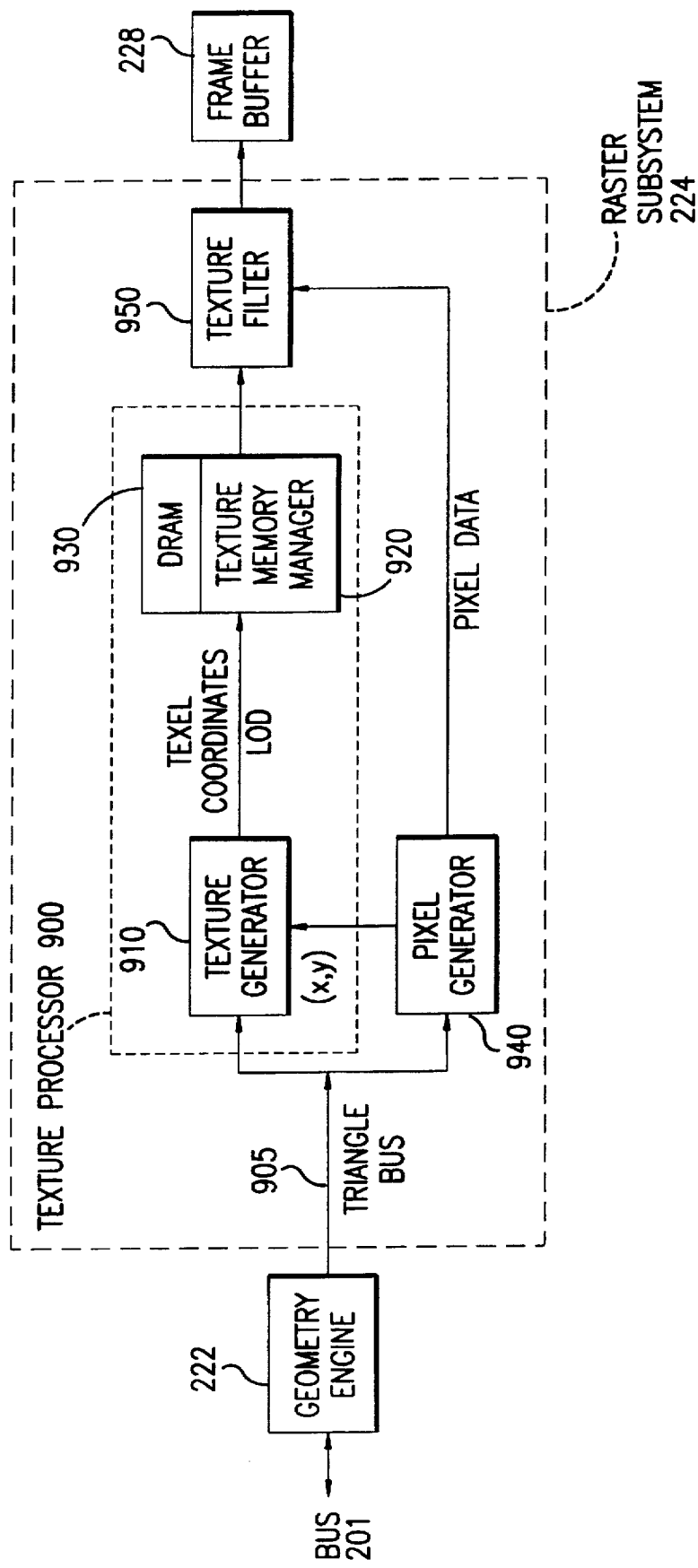
FIGS. 9 to 11 are block diagrams illustrating one example of a computer graphics subsystem implementing the present invention.
Figure 10:
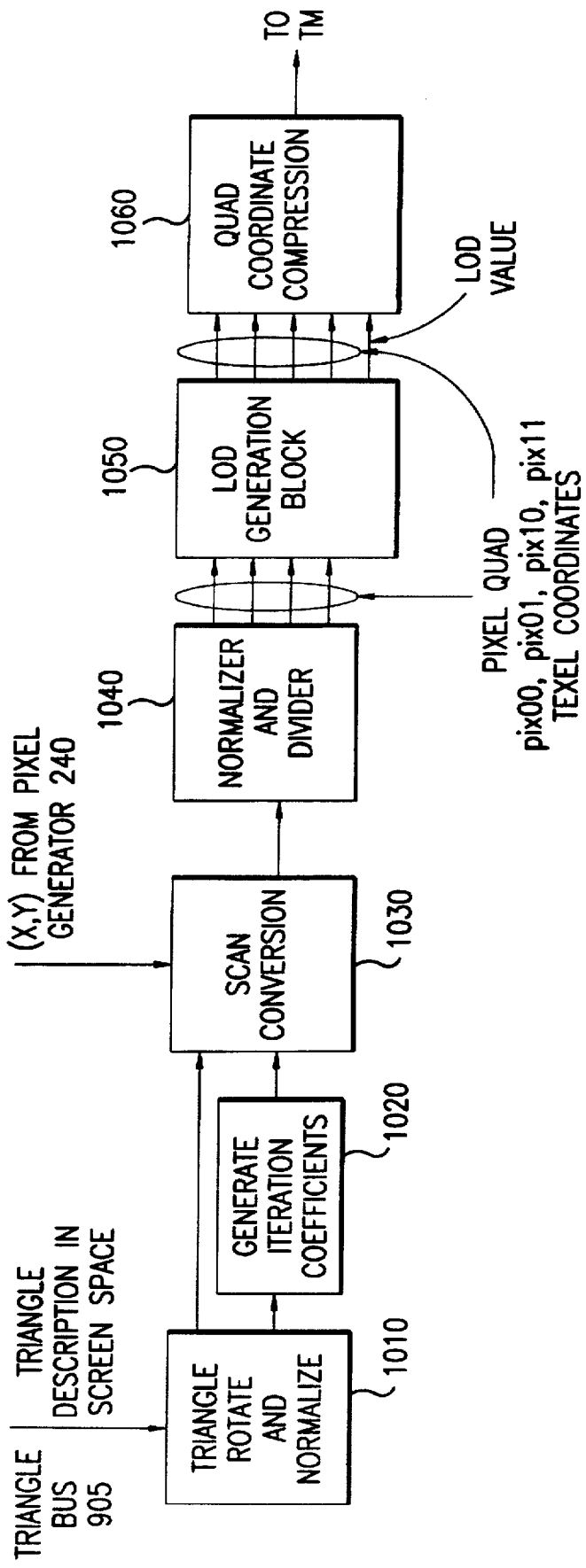
Figure 11:
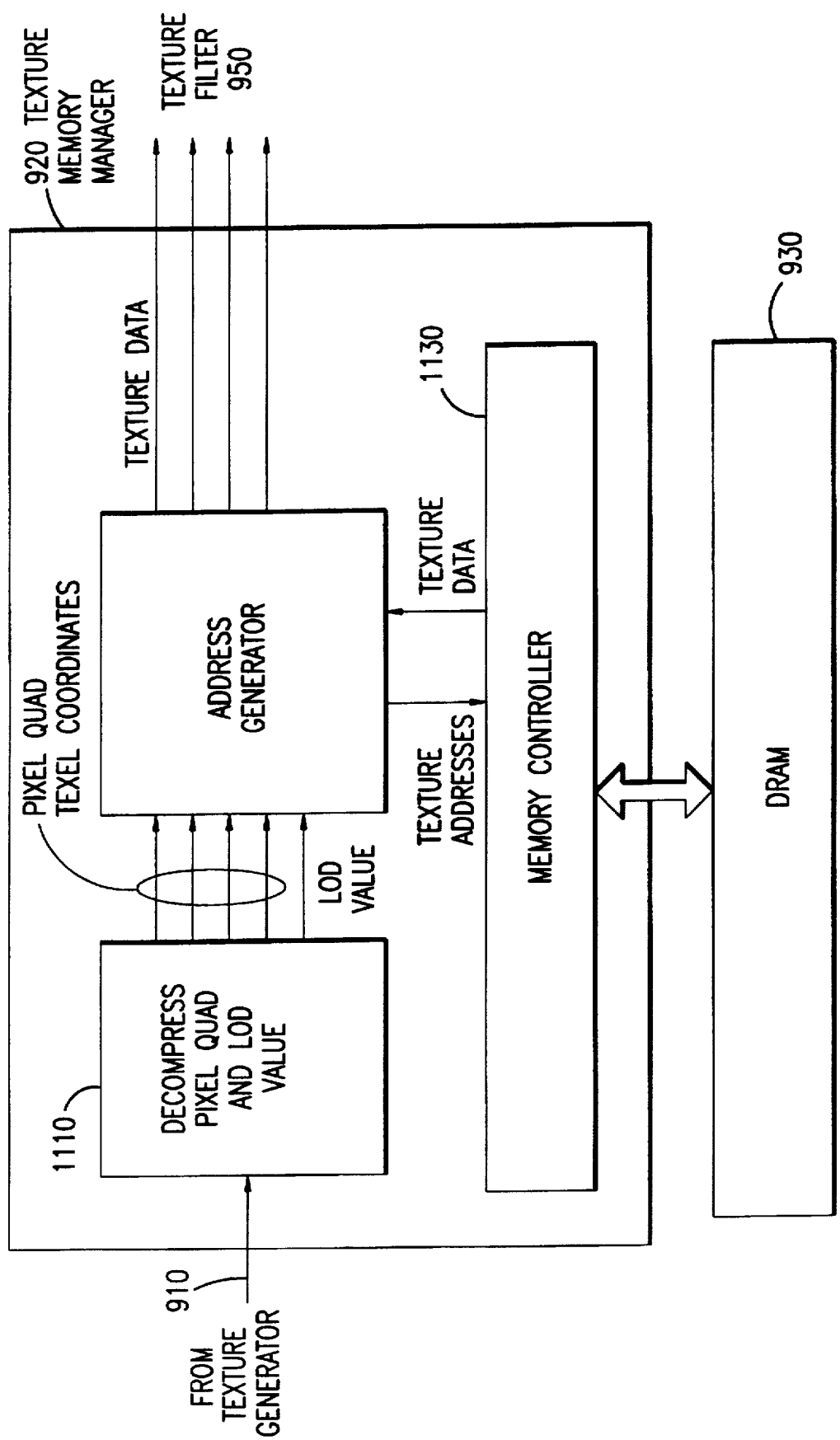

FIGS. 9 to 11 illustrate one preferred example of implementing texture processing using a clip-map within computer graphics subsystem 220 according to the present invention. FIG. 9 shows a block diagram of a texture processor 900 within raster subsystem 224. Texture processor 900 includes a texture generator 910 and a texture memory manager 920. FIG. 10 shows a block diagram of the texture generator 910. FIG. 11 shows a block diagram of a texture memory manager 920. The operation of texture processor 900 in managing a clip-map to provide a texture display image will be made even more clear by the following description.

As shown in FIG. 9, raster subsystem 224 includes texture processor 900, pixel generator 940, and texture filter 950. The texture processor 900 includes a texture generator 910 coupled to a texture memory manager 920. Texture memory manager 920 is further coupled to texture memory (DRAM) 930.

Both the texture generator 910 and the pixel generator 940 are coupled to the geometry engine 222 via a triangle bus 905. As explained earlier with respect to FIG. 2, polygonal primitives (i.e. triangles) of an image in screen space (x,y), are output from the geometry engine 222. Texture generator 910 outputs specific texel coordinates for a pixel quad and an appropriate LOD value based on the triangle description received from geometry engine 222 and the (x,y) screen space coordinates of the pixel quad received from pixel generator 940. The LOD value identifies the clip-map tile in DRAM 930 which includes a texel at the desired level of detail. When a substitute texel must be used as described above, the LOD value identifies the clip-map tile at the closest coarser level of detail which covers the sought pixel data.

Texture memory manager 920 retrieves the texel or substitute texel from the clip-map stored in DRAM 930. The retrieved texel data is then sent to a texture filter 950.

Texture filter 950 filters texel data sent by the texture memory according to conventional techniques. For example, bi-linear and higher order interpolations, blending, smoothing, and texture sharpening techniques can be applied to textures to improve the overall quality of the displayed image. Texture filter 950 (or alternatively the frame buffer 228) further combines and accumulates the texel data output from texture memory manager 930 and the corresponding pixel data output by the pixel generator 940 for storage in frame buffer 228.

FIG. 10 shows component modules 1010–1060 forming texture generator 910. Blocks 1010 to 1040 represent graphics processing modules for scan converting primitives. For purposes of this example, it is presumed that the primitive description consists of triangles and that pixel data is processed as 2×2 pixel quads. Module 1010 rotates and normalizes the input triangles received across triangle bus 905. Module 1020 generates iteration coefficients. Scan conversion module 1030 then scan converts the triangles based on the outputs of modules 1010 and 1020 and the (x,y) coordinates output from a stepper (not shown) in pixel generator 940. Texture coordinates for each pixel quad are ultimately output from scan conversion module 1030. Normalizer and divider 1040 outputs normalized texture coordinates for the pixel quad. Such scan conversion processing is well-known for both two-dimensional and three-dimensional texture mapping and need not be described in further detail.

LOD generation block 1050 determines an LOD value for texture coordinates associated with a pixel quad. Compared to LOD generation blocks used in conventional texture MIP-mapping, LOD generation block 1050 is tailored to consider the contents of the clip-map and whether a substitute texel is used. The LOD value output from LOD generation block 1050 identifies the clip-map tile which includes texels or substitute texels covering a pixel quad.

LOD generation block 1050 essentially performs two calculations to derive the LOD value, as described previously with respect to steps 842 to 846. LOD generation block 1050 first calculates an appropriate level of detail for the pixel quad (or pixel) according to standard LOD generation methods based on the individual pixel size and texel dimension. A level of detail map closest to the calculated level of detail is determined.

According to the present invention, then, a check is made to determine whether texel data for the pixel quad is included within a tile corresponding to the appropriate level of detail. When a texel is included within a tile at the appropriate level of detail, a LOD value corresponding to this tile is output. Otherwise, a LOD value is output identifying a tile at a lower level of detail which includes a substitute texel, as described earlier.

The above discussion largely refers to a pixel quad (i.e. a 2×2 pixel array). However, as would be apparent to one skilled in the art, the invention is not limited to use of a pixel quad. Using a pixel quad merely reduces the number of calculations and the amount of data which must be tracked. If desired, a separate LOD value could be calculated by LOD block 1050 for each pixel.

Other modules (not shown) can further use the pixel quad and LOD value output from LOD generation block 1050 to perform supersampling, clamping, or other graphics display optimizing processes.

The present invention takes further advantage of the use of a pixel quad to reduce the amount of data required to be sent from the texture generator 910 to the texture memory manager 920. Quad coordinate compression module 1060 compresses the texture coordinates of a pixel quad and the LOD value data sent to one or more texture memory managers 920. In particular, in a 2×2 pixel quad, texture coordinates for one pixel are needed but the other three pixels can be defined relative to the first pixel. In this way, only the differences (i.e. the offsets) between the centers of the other three pixels relative to the center of the first pixel need to be transmitted.

FIG. 11 shows component modules forming texture memory manager 920. Module 1110 decompresses texture coordinates of a pixel quad and LOD value information received from texture generator 910. Texture coordinates for one pixel are received in full. Texture coordinates for the other three pixels can be determined by the offsets to the first pixel texture coordinates. The LOD value is associated with each pixel.

The texture coordinates sent from texture generator 910 are preferably referenced to the global texture MIP-map stored and addressed in mass storage device 208. Address generator 1120 translates the texture coordinates for the pixel quad from the global texture MIP-map space of mass storage device 208 to texture coordinates specific to the clip-map stored and addressed in DRAM 930. Alternatively, such translation could be carried out in the texture generator 910 depending upon how processing was desired to be distributed.

Address generator 1120 first identifies a specific tile at the level of detail indicated by the LOD value. To translate texture coordinates from global texture MIP-map space to the specific tile, the address generator 1120 considers both (1) the offset of the specific tile region relative to a complete level of detail map (i.e. tile offset) and (2) the center eyepoint location of a tile (i.e. update offset).

Memory addresses corresponding to the specific texture coordinates are then sent to a memory controller 1130. Memory controller 1130 reads and returns texture data from DRAM 930, through address generator 1120, to texture filter 950.

As would be apparent to one skilled in the art from the foregoing description, a conventional LOD value can be sent from the LOD generation block 1050 without regard to the selected portions of the texture MIP-map stored in the clip-map. The steps for determining whether a texel is within a tile and for determining a LOD value for a substitute texel would then be carried out at the texture memory manager 920.

XIII. Square Clip-Map Tiles Example

Selecting, managing and accessing texel data in a clip-map will now be discussed with respect to the specific square clip-map 440. According to another feature of the present invention, each tile in DRAM 930 is configured as a square centered about a common axis stemming from the eyepoint location. Each tile has a progressively coarser resolution varying by factor of 2. These restrictions simplify texel addressing for each tile in the cubical part of a clip-map considerably. The additional cost in hardware and/or software to address the tiles is minimal both when the tiles are initially selected and after any subtexture loads update the tiles.

By selecting square tiles to form the initial clip-map stored in DRAM 930, the work of a processor 202 (or a dedicated processor unit in the graphics subsystem 220) is straightforward. First, the center of the finest level (LOD[0]) is chosen. Preferably the center ($s_{center}, t_{center}$) is defined as integers in global (s,t) texture coordinates. A finest resolution tile 410 is then made up from the surrounding texel data in LOD[0] map 400 within a predetermined distance d from the center point. All the other tiles for the levels of the cubical part (LOD[1]-LOD[M]) are established by shifting the center position down along the eyepoint. Thus, the texture coordinates ($s_{centern}, t_{centern}$) for a tile at level of detail LOD[n] are given by:

$$s_{centern} = s_{center} >> n$$

$$t_{centern} = t_{center} >> n.$$

where >>n denotes n shift operations. Texel data for the other tiles 401–404 is likewise swept in from regions a predetermined distance d in the s and t direction surrounding each center point.

Simple subtraction and comparison operations are carried out in texture generator 910 to determine whether a texel for a pixel quad is within a tile at an appropriate LOD. The finest, appropriate level of detail is determined by conventional techniques (see steps 842 and 843). The additional step of checking whether the desired texel for a pixel quad is actually included within a tile at that LOD (step 844) can be performed by calculating the maximum distance from four sample points in a pixel quad to the center of the tile. To be conservative, s and t distances for each of four sample points ($s_0, t_0$) . . . ($s_3, t_3$) can be calculated within a LOD generation block 1050 as follows:

$$s_0 \, dist = |s_{centern} - s_0|$$
$$t_0 \, dist = |t_{centern} - t_0|$$
$$\ldots$$
$$s_3 \, dist = |s_{centern} - s_3|$$
$$t_3 \, dist = |t_{centern} - t_3|$$

where the tile center point at a LOD value n is given by ($s_{centern}, t_{centern}$)

Because the four samples of a pixel quad are strongly related, performing only two of the above subtractions is generally sufficient. Maximum distances $s_{max}$ and $t_{max}$ for a pixel quad are then determined by comparison. The use of square tiles means only one maximum distance in s or t needs to be calculated.

Based on the maximum distances in s and t, the finest available tile including texel or substitute texel data for the pixel quad is determined in a few arithmetic operations. If the constant size of the tiles is defined by $s_{tile}$ and $t_{tile}$ where the tile size equals ($2^{s_{tile}}, 2^{t_{tile}}$) the finest available LOD value is given by the number of significant bits (sigbits) as follows:

LOD s finest=sigbits ($s_{max}$)−$s_{tile}$;

LOD t finest=sigbits ($t_{max}$)−$t_{tile}$.

As would be apparent to one skilled in the art, LOD generation block 1050 can perform the above calculations and output the greater of the two numbers as the LOD value identifying the appropriate finest resolution tile containing texel or substitute data.

Finally, in addition to reducing the work of LOD generation block 1050, the restrictive use of equal-sized square tiles and power of two changes in resolution between tiles simplifies the work of the texture memory manager 920. Address generator 1120 can translate global texture coordinates referencing LOD maps to specific tile texture coordinates in the cubical part of the clip-map by merely subtracting a tile offset and an update offset. The tile offset represents the offset from the corner of an LOD map to the corner of a tile. The update offset accounts for any updates in the tile regions which perform subtexture loads to track changes in the eyepoint location and/or field of view.

Thus, an address generator 1120 can obtain specific s and t tile coordinates ($s_{fine}$, $t_{fine}$) for a fine tile having a level of detail equal to the LOD value provided by the texture generator 910 as follows:

$$s_{fine} = s_{TG} - s \text{ tile offset}_{LOD\ value} - s \text{ update offset}_{LOD\ value}$$

$$t_{fine} = t_{TG} - t \text{ tile offset}_{LOD\ value} - t \text{ update offset}_{LOD\ value};$$

where $s_{TG}$ and $t_{TG}$ represent the global s and t texture coordinates provided by a texture generator 910, s and t tile offset $_{LOD\ value}$ represent tile offset values in s and t for a tile at the LOD value provided by the texture generator 910, and s and t update offset $_{LOD\ value}$ represent update offset values in s and t for a tile at the LOD value.

Some texture filters and subsequent processors also use texel data from the next coarser level of detail. In this case, texture memory manager 920 needs to provide texel data from the next coarser tile as well. Once the specific $s_{fine}$ or $t_{fine}$ coordinates are calculated as described above s and t coordinates ($s_{coarse}$, $t_{coarse}$) for the next coarser tile are easily calculated.

In particular, the global texture coordinates ($s_{TG}$, $t_{TG}$) are shifted one bit and reduced by 0.5 to account for the coarser resolution. The tile offset and update offset values (tile offset $_{LODcoarse}$ and update offset $_{LODcoarse}$) for the next coarser tile are also subtracted for each s and t coordinate. Thus, address generator 1120 determines specific texture coordinate in the next coarser tile as follows:

$$s_{coarse} = \text{trunc}[(s_{TG} >> 1) - 0.5)] - s \text{ tile offset }_{LODcoarse} - s \text{ update offset}_{LOD\ coarse}; \text{ and}$$

$$t_{coarse} = \text{trunc}[(t_{TG} >> 1) - 0.5)] - t \text{ tile offset}_{LOD\ coarse} - t \text{ update offset}_{LOD\ coarse}.$$

XIV. Conclusion

While specific embodiments of the present invention have been described above, it should be understood that they have been presented by way of example only, and not limitation. It will be understood by those skilled in the art that various changes in form and details may be made therein without departing from the spirit and scope of the invention as defined in the appended claims. Thus, the breadth and scope of the present invention should not be limited by any of the above-described exemplary embodiments, but should be defined only in accordance with the following claims and their equivalents.

What is claimed is:

1. A computer graphics raster subsystem for providing texture from a texture pattern to an image to be rendered for display in real-time comprising:

texture memory for storing a select portion of a texture map representation of said texture pattern, said select texture map portion containing texture data at multiple levels of detail to substantially cover said image in a display view;

texture mapping means for mapping texture data from said select texture map portion stored in said texture memory to corresponding pixel data defining said display image; and clip-map updating means for updating edges of said select texture map portion to track changes in the location of the eyepoint in real-time.

2. The system of claim 1, wherein said texture memory stores said texture data in a two-dimensional or a three-dimensional texel array.

3. A computer graphics processing system for providing texture from a texture pattern in a display image, comprising:

first texture memory for storing a texture map, said texture map having multiple level of detail maps for storing texels representing the texture pattern filtered at successively coarser resolutions;

clip-map selecting means for selecting a clip-map within said texture map, said clip-map consisting of a set of tiles corresponding to regions of said level of detail maps substantially covering the display image;

second texture memory for storing said clip-map;

texture processor means for retrieving texels from said clip-map which map to pixel data forming the display image; and clip-map updating means for updating texels at edges of said tiles stored in said second texture memory to track changes in the location of an eyepoint.

4. The computer graphics system of claim 3, wherein said first and second texture memory constitute a hierarchial memory arrangement relative to said texture processor means, said texture processor means accesses texels stored in said second texture memory faster than said first texture memory.

5. The computer graphics system of claim 3, wherein:

said first texture memory comprises a mass storage device, and said second texture memory comprises at least one of a static random access memory (SRAM) device and a dynamic random access memory (DRAM) device.

6. The computer graphics system of claim 3, wherein said clip-map selecting means determines the area of the texture pattern covered by each tile based on the location of an eyepoint of the display image.

7. The computer graphics system of claim 3, wherein said clip-map updating means updates texels at edges of said tiles stored in said second texture memory to track changes in the location of a new eyepoint for a new display image.

8. The computer graphics system of claim 7, wherein said clip-map updating means discards texels from said second texture memory and loads texels from said first texture memory into said second texture memory; said texels being discarded from at least one tile edge located furthest from said new eyepoint and said texels being loaded into at least one tile edge located closer to said new eyepoint.

9. The computer graphics subsystem of claim 3, wherein, said texture processor means further retrieves coarser substitute texels from said clip-map.

10. The computer graphics system of claim 3, wherein textured display images are output for display in real-time.

11. The computer graphics system of claim 3, wherein said clip-map contains over 99% less texels than said texture map.

12. The computer graphics system of claim 3, wherein said texture processor means comprises:

a texture generator; and a texture memory manager coupled between said texture generator and said second texture memory;

wherein said texture generator includes a texture coordinate generator for generating texel coordinates for each pixel and a LOD generator for generating a LOD value for each pixel, said LOD value identifies the tile which covers the pixel and has texel dimensions closest in size to the pixel, said texel coordinates and LOD value being output for each pixel to said texture memory manager; and wherein said texture memory manager retrieves texels from said clip-map for combining with said pixels to form a textured display image.

13. The system of claim 3, wherein said second texture memory stores texels in said clip-map in a two-dimensional or a three-dimensional texel array.

14. A computer graphics processing system for providing texture from a texture pattern in a display image, comprising:

first texture memory for storing a texture map said texture map having multiple level of detail maps for storing texels representing the texture pattern filtered at successively coarser resolutions;

clip-map selecting means for selecting a clip-map within said texture map, said clip-map consisting of a set of tiles corresponding to regions of said level of detail maps substantially covering the display image;

second texture memory for storing said clip-map; and texture processor means for retrieving texels from said clip-map which map to pixel data forming the display image, wherein said texture processor means comprises:

texture coordinate generator for generating at least one texture coordinate identifying where a pixel in the display image maps to the texture pattern, LOD generator for generating a LOD value, and a memory controller for retrieving at least one texel from said clip-map stored in said second texture memory based on said at least one texture coordinate and said LOD value, wherein, said LOD generator includes:

LOD identifying means for identifying an appropriate level of detail representing the level of detail map amongst said multiple level of detail maps where texel dimension is closest in size to said pixel, texel determining means for determining whether a texel at said at least one texture coordinate is included in a first tile at said appropriate level of detail, said LOD value being set to said appropriate level of detail when said texel is included in said first tile, and substitute texel determining means for determining a substitute texel in a second tile which includes said at least one texture coordinate, said LOD value being set to the level of detail of said second tile.

15. A computer graphics processing system for providing texture from a texture pattern in a display image, comprising:

first texture memory for storing a texture map, said texture map having multiple level of detail maps for storing texels representing the texture pattern filtered at successively coarser resolutions;

clip-map electing means for selecting a clip-map within said texture map, said clip-map consisting of a set of tiles corresponding to regions of said level of detail maps substantially covering the display image;

second texture memory for storing said clip-map; and texture processor means for retrieving texels from said clip-map which map to pixel data forming the display image, wherein said set of tiles comprises a cubical part and a pyramidal part;

said one or more tiles in said cubical part comprising one or more arrays of texels, respectively, within said regions of said level of detail maps, and said one or more tiles in said pyramidal part comprising one or more arrays of texels, respectively, said one or more arrays texels in said pyramidal part consisting of said level of detail maps which are equal to or smaller than said one or more tiles in said cubical part.

16. A method for providing texture from a texture pattern in a display image comprising the steps of:

storing a texture map in a first texture memory, said texture map having multiple level of detail maps for storing texels representing the texture pattern filtered at successively coarser resolutions;

selecting a clip-map within said texture map, said clip-map consisting of a set of tiles corresponding to regions of said level of detail maps, said set of tiles being centered in a field of view extending from an eyepoint location of the display image to substantially cover the display image;

storing said clip-map in a second texture memory;

retrieving texels from said clip-map stored in said second texture memory which map to pixels forming the display image; and updating texels at edges of said tiles stored in said second texture memory to track changes in the location of the eyepoint location.

17. The method of claim 16, wherein said updating step updates said clip-map to track a change in said eyepoint location for a new display image.

18. The method of 17, further comprising the step of checking whether a texel to be accessed is located in a fringe portion of a tile, said fringe portion including the edges where texels are updated, and using a substitute texel when said texel is located in said fringe portion.

19. The method of claim 16, wherein said updating step update texels at edges of said tiles stored in said second texture memory to track a change to a new eyepoint location for a new display image.

20. The method of claim 19, wherein said updating step includes the steps of:

discarding texels from an edge of a tile located furthest from said new eyepoint location; and loading texels from said first texture memory to said second texture memory, said texels being loaded next to an edge of a tile closer to the new eyepoint location wherein the number of texels loaded equals the number of texels discarded to maintain the size of said tile constant.

21. The method of claim 16, further comprising the step of retrieving coarser substitute texels from said clip-map stored in said second texture memory.

22. The method of claim 16, wherein said storing step stores texels in said clip-map in a two-dimensional or a three-dimensional texel array.

23. A method for providing texture from a texture pattern in a display image comprising the steps of:

storing a texture map in a first texture memory, said texture map having multiple level of detail maps for storing texels representing the texture pattern filtered at successively coarser resolutions;

selecting a clip-map within said texture map, said clip-map consisting of a set of tiles corresponding to regions of said level of detail maps, said set of tiles being centered in a field of view extending from an eyepoint location of the display image to substantially cover the display image;

storing said clip-map in a second texture memory; and retrieving texels from said clip-map stored in said second texture memory which map to pixels forming the display image, wherein said retrieving step includes the following steps:

generating at least one texture coordinate identifying where a pixel in the display image maps to the texture pattern, generating a LOD value, and retrieving at least one texel from said clip-map stored in said second texture memory based on said at least one texture coordinate and said LOD value, wherein, said LOD value generating step includes:

identifying an appropriate level of detail representing the level of detail map amongst said multiple level of detail maps where texel dimension is closest in size to said pixel, determining whether a texel at said at least one texture coordinate is included in a first tile at said appropriate level of detail and setting said LOD value to said appropriate level of detail when said texel is included in said first tile, and when said texel in not included in said first tile, determining a substitute texel in a coarser second tile which includes said at least one texture coordinate and setting said LOD value to the level of detail of said second tile.

24. A texture processor for mapping texels from a clip-map to corresponding pixels, wherein the clip-map consists a set of tiles representing a selected portion of a texture MIP-map which substantially covers the pixels, said texture processor comprising:

a texture memory storing the clip-map;

a texture generator; and a texture memory manager coupled between said texture generator and said texture memory, wherein said texture generator includes a texture coordinate generator for generating texel coordinates for each pixel and a LOD generator for generating a LOD value for each pixel, said LOD value identifies the tile which covers the pixel and has texel dimensions closest in size to the pixel, said texel coordinates and LOD value being output for each pixel to said texture memory manager; and said texture memory manager retrieves texels from the clip-map stored in said texture memory for combining with said pixels to form a textured display image.

25. The texture processor of claim 24, wherein said texture memory stores said texels in two-dimensional or three-dimensional texel arrays.

26. The texture processor of claim 24, wherein said texture memory manager includes an address generator for subtracting at least one of a tile offset and an update offset.

27. The texture processor of claim 24, wherein 2×2 groups of pixels are processed as pixel quads.

28. The texture processor of claim 27, wherein said texture generator includes a quad coordinate compression block for compressing texel coordinates for each pixel quad sent to said texture memory manager, and said texture memory manager includes a quad coordinate decompression block to decompress the compressed texel coordinates for each pixel quad.

* * * * *